(12) United States Patent
Nemoto et al.

(10) Patent No.: US 8,169,728 B2
(45) Date of Patent: May 1, 2012

(54) MAGNETIC MEDIUM HAVING AN ARTIFICIAL PATTERN STRUCTURE USING A GRADIENT OF A MAGNETIZATION REVERSAL FIELD AND A METHOD OF USE THEREOF

(75) Inventors: Hiroaki Nemoto, Kanagawa (JP); Hiroyuki Suzuki, Kanagawa (JP); Masae Suzuki, legal representative, Kanagawa (JP); Miki Hara, Kanagawa (JP); Yoshio Suzuki, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 21 days.

(21) Appl. No.: 12/630,728

(22) Filed: Dec. 3, 2009

(65) Prior Publication Data

US 2010/0142084 A1   Jun. 10, 2010

(30) Foreign Application Priority Data

Dec. 5, 2008   (JP) .................................. 2008-311524

(51) Int. Cl.
*G11B 5/09* (2006.01)
*G11B 5/596* (2006.01)
*G11B 5/82* (2006.01)

(52) U.S. Cl. ......................... 360/48; 360/77.02; 360/135

(58) Field of Classification Search ........................ None
See application file for complete search history.

(56) References Cited

U.S. PATENT DOCUMENTS

| | | | |
|---|---|---|---|
| 6,185,063 B1 | 2/2001 | Cameron | 360/78.04 |
| 2005/0142387 A1 | 6/2005 | Araki et al. | 428/694 |
| 2007/0096854 A1 | 5/2007 | Matsumoto et al. | 335/208 |
| 2008/0204915 A1* | 8/2008 | Albrecht et al. | 360/48 |
| 2010/0033872 A1* | 2/2010 | Xi et al. | 360/135 |
| 2010/0061018 A1* | 3/2010 | Albrecht et al. | 360/135 |

FOREIGN PATENT DOCUMENTS

| | | |
|---|---|---|
| JP | 2008-123638 | 5/2008 |
| JP | 2005-190552 | 7/2008 |
| WO | 01/65547 | 9/2001 |

OTHER PUBLICATIONS

Suess, D. et al., "Exchange spring recording media for areal densities up to 10 Tbit/in$^2$" Journal of Magnetism and Magnetic Materials 290-291 (2005) 551-554.

(Continued)

*Primary Examiner* — Daniell L Negron
*Assistant Examiner* — Regina N Holder
(74) *Attorney, Agent, or Firm* — Zilka-Kotab, PC

(57) ABSTRACT

To avoid the occurrence of a recording error by suppressing the influence that a magneto-static interaction acting between the pattern dots exerts on a recording process and expand a margin for recording synchronization timing lag or tracking misregistration on the pattern dot. Each pattern dot has a structure in which a plurality of parts having different magnetization reversal fields are bonded with exchange interaction in the in-plane direction of a medium, substrate. The positional relationship between the parts having different magnetization reversal fields is substantially coincident between the adjacent pattern dots, which are arranged to have a gradient of magnetization reversal field in a track direction or track transverse direction. Further, the recording is performed by adapting a gradient of recording magnetic field to the gradient of magnetization reversal field. Other methods and systems are described as well.

20 Claims, 11 Drawing Sheets

OTHER PUBLICATIONS

The Abstract Book of the 52$^{nd}$ Annual Conference on Magnetism and Magnetic Materials, GC-08, Schrefl et al. 2006.
Honda, Naoki et al., "Recording Simulation of Patterned Media Toward 2 Tb/in$^2$" IEEE Transactions on Magnetics. vol. 43, No. 6, Jun. 2007.
Mitsuzuka, K. et al., "Magnetic Properties of Co-Pt/Co hard soft stacked dot arrays" Journal of Applied Physics 103, 07C504 (2008).
Takahashi, Y.K. et al., "Magnetization reversal of FePt hard/soft stacked nanocomposite particle assembly" Journal of Applied Physics 100, 074305 (2006).

* cited by examiner (a) Magnetic field distribution in the track direction (b) Magnetic field distribution in the track transverse direction

MAGNETIC MEDIUM HAVING AN ARTIFICIAL PATTERN STRUCTURE USING A GRADIENT OF A MAGNETIZATION REVERSAL FIELD AND A METHOD OF USE THEREOF

RELATED APPLICATIONS

The present application claims priority to Japanese Patent Application No. 2008-311524, filed Dec. 5, 2008, which is incorporated herein by reference.

FIELD OF THE INVENTION

The present invention relates to magnetic recording, and more particularly, to a pattern medium and a magnetic recording method using the pattern medium.

BACKGROUND OF THE INVENTION

A hard disk drive (HDD) is an information storage device which has grown in popularity and has become almost indispensable in computers and various household electronics products, particularly for applications involving mass information storage. In a HDD, a magnetic recording method is employed, in which information is recorded in a magnetized state of a ferromagnetic thin film (magnetic recording film) formed on a recording medium. The magnetic recording film is an aggregate of minute magnetic particles, in which each magnetic particle is given a magnetic characteristic capable of stably maintaining one of two magnetized states corresponding to the recording information. Also, the adjacent magnetic particles are formed sufficiently separated from each other such that each magnetic particle can indicate an independent magnetized state irrespective of the surrounding magnetic particles.

In a conventional magnetic recording method, magnetic particles making up the magnetic recording film have various sizes, and their arrangement is random. In forming the magnetic recording film through a thin film formation process, such as coating or sputtering, the growth or arrangement of magnetic particles is determined through a local formation process for the magnetic recording film, whereby such nonhomogeneity is generally inevitable. The structure of these types of magnetic recording films is described in Japanese Patent Office (JPO) Pub. No. JP-A-2005-190552, as just one example. Also, one recording information unit (called one bit) is recorded for a group of many adjacent magnetic particles, using a magnetic head. At this time, the serration along the shape of each magnetic particle in a magnetization transition area of the recording bit appears as a "transition noise." However, variations in the size or arrangement of each of the magnetic particles are averaged by allocating many magnetic particles to one bit, whereby a recordable and reproducible system can be constructed without error. That is, if the magnetic particle is sufficiently small for the size of the recording bit, a deterioration in the signal quality does not become noticeable.

With the higher recording density used in HDD in recent years, there is a demand for making the area of forming one hit smaller. To maintain the number of magnetic particles per bit, the area of a magnetic particle is also reduced. However, in recent years, it has become more difficult to make the magnetic particles smaller, as a limit is fast approaching on the minute size already being used, e.g., the magnetic particles soon will not be able to be made smaller without losing their ability to hold information.

This effect occurs because the magnetized state of the magnetic particle is always subject to a disturbance owing to ambient thermal energy. When the environmental temperature is T, the magnitude of thermal disturbance energy is estimated to be $k_BT$ ($k_B$ is the Boltzmann constant). On the other hand, the stability of the magnetized state of the magnetic particle is estimated in terms of KuV. Herein, Ku is a magnetic anisotropy energy of the material composing the magnetic particles, and V is the volume of magnetic particle. If the ratio $KuV/k_BT$ is smaller, the stability of the recording information is impaired. Ku has a restriction due to material selection or the magnetic field required for recording. Also, $k_BT$ is determined depending on the temperature (around 300K) at which the HDD is used. Accordingly, the fine quality of the magnetic particles (smaller V) necessarily leads to a decrease in $KuV/k_BT$, making it impossible to keep the recording information stable, whereby the function of the recording medium is lost.

The above problem cannot be avoided using conventional magnetic recording methods, and at present is an important factor in deciding the upper limit of the recording density of a HDD. To overcome this problem, a "bit pattern medium," presupposing that one magnetic particle is allocated to one bit, is regarded as promising in the recording medium technology of the next generation. The particular features of a bit patterned medium are described in JPO Pub. No. JP-A-2008-123638 and IEEE Trans. Magn., vol. 43, p. 2142 (2007), but a quick summary of this technology follows.

A magnetic particle in bit pattern medium, which is essentially different from a conventional magnetic particle, is an aligned pattern dot. To represent the recording bit with one magnetic particle or a smaller number of magnetic particles, the size and arrangement of magnetic particles cannot be random, as they conventionally are arranged. The size and arrangement are controlled with precision by the recording and reproducing system. With the precise size and arrangement, the recording position of information can be correctly determined or the recorded information can be read as a positional signal.

On the other hand, the pattern dot is the minimum unit of magnetization reversal. If a plurality of regions having different magnetized states exist within the pattern dot, the correspondence between the recording information and the pattern dot is not detectable, so that the correct recording and reproducing cannot be made.

By satisfying the above prerequisites, the area of one magnetic particle (pattern bit) can be put closer to the area occupied by one bit in the bit pattern medium than in conventional recording schemes. As a result, the volume of pattern dots in the magnetization reversal unit is significantly larger than the conventional volume; thereby, it is possible, in principle, to realize a higher recording density while maintaining thermal stability of the head and HDD.

In IEEE Trans. Magn., vol. 43, p. 2142 (2007), a detailed examination for the recording and reproducing process for a bit pattern medium by simulation is made. In performing magnetic recording on the pattern dots formed on the substrate, switching of the direction of recording magnetic fields in synchronism with the pattern dot position is employed. It is noted that the recording synchronization timing lag remarkably increases the recording error on bit pattern medium. If the pattern dot position on the recording medium is displaced from the intended position because of a problem associated with the pattern formation process, there is the same influence. Also, recording quality is remarkably degraded due to head misregistration (tracking misregistration) in the track transverse direction.

In IEEE Trans. Magn., vol. 43, p. 2142 (2007), the reason why there is a very strict restriction on the recording synchronization timing or pattern misregistration is that a magnetization reversal field dispersion of the pattern dot increases due to a magneto-static interaction with the adjacent pattern dot. The relationship between the magnetization direction of the pattern dot having already completed recording and the pattern dot on an adjacent track and the magnetization direction of the pattern dot subject to recording from now is always different. Accordingly, the magneto-static interaction between these pattern dots brings about an unpredictable variation in the effective recording magnetic field, causing a recording error. In JP-A-2008-123638, a method for solving this problem is disclosed in which an exchange interaction acting in the opposite direction to the magneto-static interaction is introduced between the pattern dots.

In addition, a method for constructing the single pattern dot in which two portions having different magnetic characteristics are closely contacted and magnetically bonded with exchange interaction is described below. For bit pattern medium, the pattern dot is the minimum unit of magnetization reversal, as previously described. Accordingly, the two portions are bonded by the exchange interaction stronger than the magneto-static interaction.

In J. Appl. Phys., vol. 100, p. 074305 and J. Appl. Phys., vol. 103, p. 07C504, a structure in which two magnetic layers having different anisotropy magnetic fields ($H_k$) are laminated in a direction perpendicular to a substrate plane is disclosed. Within the pattern dot having this structure, the portion having smaller anisotropy magnetic field starts the magnetization reversal ahead and then the magnetization reversal of the portion having larger anisotropy magnetic field is induced. In the sense of the structure for realizing such a non-uniform magnetization reversal process, this structure is called an exchange spring structure. With this exchange spring structure, it is possible to realize the magnetization reversal of the pattern dot in the small magnetic field, while maintaining the relatively high thermal stability (total sum of KuV in the upper and lower layers), as theoretically disclosed in J. Magn. Magn. Mater. Vol. 290-291, p. 551 (2005). Thereby, it is expected that high recording density can be realized by making the pattern dots finer, while suppressing the head magnetic field required for recording.

In The Abstracts Book of The 52th Annual Conference on Magnetism and Magnetic Materials, GC-08, there is a description of a structure in which the single pattern dot is formed by two portions having different magnetization reversal fields ($H_k$). However, the document discloses that the structure in which two portions having different magnetization reversal fields $H_k$ are closely contacted in the parallel direction to the substrate plane, not in the perpendicular direction. In this case, a non-uniform magnetization reversal mode peculiar to the exchange spring structure acts, whereby it is possible to reduce the head magnetic field required for recording, while maintaining the relatively high thermal stability.

Therefore, to achieve higher recording density of a few Tb/in² class in the bit pattern medium, as described above, is difficult while maintaining other desired properties of the head and HDD, such as decreasing the magneto-static interaction with adjacent pattern dots as much as possible, and suppressing a variation in the effective magnetization reversal field of the pattern dots caused by a difference in the surrounding magnetized state. The method of introducing the exchange interaction acting in an opposite direction to the magneto-static interaction between the pattern dots as proposed in JPO Pub. No. JP-A-2008-123638 can solve this problem, in an ideal state. However, if the exchange interaction between the pattern dots is not uniform, it is difficult to attain the desired effect, or rather, there is a danger that the dispersion of the magnetization reversal field increases. To obtain the uniform exchange interaction, it is required that the magnetic material for connecting the pattern dots is formed quite precisely, and the level of precision is not easy to obtain.

Generally, if each pattern dot shape on the substrate plane is identical, it is possible to suppress the magneto-static interaction between the pattern dots relatively easily by reducing the thickness of the magnetic recording film composed of the pattern dots. For example, in a bit pattern medium in which the pattern dots (square shape, 20 nm×20 nm) are arranged every 25 nm on the substrate plane, if the thickness of the magnetic recording film is reduced from 20 nm to 5 nm, the magneto-static field is decreased to one-half or less. Also, for fixed regular intervals of pattern dots, the magneto-static interaction can also be decreased by reducing the area of the pattern dot to increase the gap between pattern dots. In the previous example, if the size of pattern dot is reduced from the square of 20 nm×20 nm to a square of 10 nm×10 nm, with the regular intervals of pattern dots fixed, the magneto-static field is also decreased to one-half or less.

However, in the previous examples, the volume V of each pattern dot is greatly decreased. If the volume V is smaller, it is required that the magnetic anisotropy energy Ku is increased to maintain KuV, that is a thermal stability index, and it is inevitable that a material having a greater magnetization reversal field will be used, presupposing that the head magnetic field required for recording is increased. On the other hand, in consideration of reproduction of the magnetic information recorded on the pattern dot, the reproducing signal strength is greatly decreased, bringing about a danger that the signal to noise ratio (SNR) is deteriorated so much that reading the information may be impossible, especially when the spacing between the pattern dots is larger.

In light of these circumstances, a magnetic medium and recording device, such as a HDD, which can have an increased margin for the recording synchronization timing lag or tracking misregistration on the pattern dot by combining such a structure so that the recording error is less likely to occur, even if the magneto-static interaction itself exists, would be very beneficial to the recording industry.

SUMMARY OF THE INVENTION

According to one embodiment, a magnetic recording medium includes a substrate and a magnetic recording film having an artificial pattern including pattern dots cut by patterning positioned above the substrate. An individual pattern dot is a minimum magnetization reversal unit bearing recorded information as magnetic information, and each pattern dot has a gradient of a magnetization reversal field in an in-plane direction of the substrate. Also, a gradient direction of the magnetization reversal field is substantially coincident between adjacent pattern dots.

In another embodiment, a magnetic recording method for a pattern medium comprises controlling a tracking position of a recording head to scan a recording magnetic pole center portion on a side where a magnetization reversal field is relatively greater than at a center of a pattern dot of an artificial pattern on a medium, and applying a recording magnetic field in synchronism with a time when a trailing edge of the recording magnetic pole passes over the pattern dot. The pattern dot is a minimum magnetization reversal unit bearing recorded information as magnetic information and a gradient direction of the magnetization reversal field is substantially coincident between adjacent pattern dots.

In another embodiment, a magnetic recording method for a pattern medium includes controlling a tracking position of a recording head so that a stronger magnetic field is applied to a region where a magnetization reversal field of a pattern dot of an artificial pattern on a medium to record is relatively greater and applying a recording magnetic field in synchronism with a timing when a trailing edge of the recording magnetic pole passes over the pattern dot to record. The pattern dot is a minimum magnetization reversal unit bearing recorded information as magnetic information and the pattern dot has a gradient of a magnetization reversal field in a track transverse direction. Also, a region where the magnetization reversal field is relatively small is disposed on a side of the pattern dot having a previously recorded track and a gradient direction of the magnetization reversal field is substantially coincident between adjacent pattern dots.

In a further embodiment, a magnetic recording method for a pattern medium includes locally heating a region where a magnetization reversal field of a pattern dot of an artificial pattern to record is relatively greater and applying a recording magnetic field to the pattern dot to record. The pattern dot is a minimum magnetization reversal unit bearing recorded information as magnetic information, the pattern dot has a gradient of a magnetization reversal field in an in-plane direction of a substrate, and a gradient direction of the magnetization reversal field is substantially coincident between adjacent pattern dots.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
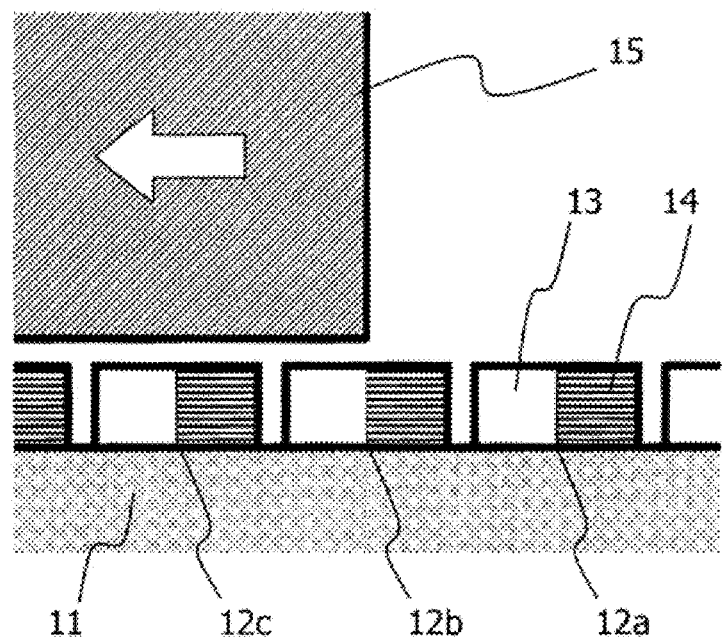
FIG. 1 is a cross-sectional view showing bit pattern medium and a recording magnetic pole of a magnetic head in a recording track direction, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic recording medium comprises a substrate and a magnetic recording film having an artificial pattern including pattern dots cut by patterning positioned above the substrate, wherein an individual pattern dot is a minimum magnetization reversal unit bearing recorded information as magnetic information. Also, each pattern dot has a gradient of a magnetization reversal field in an in-plane direction of the substrate, and a gradient direction of the magnetization reversal field is substantially coincident between adjacent pattern dots.

In another general embodiment, a magnetic recording method for a pattern medium comprises controlling a tracking position of a recording head to scan a recording magnetic pole center portion on a side where a magnetization reversal field is relatively greater than at a center of a pattern dot of an artificial pattern on the medium, and applying a recording magnetic field in synchronism with a time when a trailing edge of the recording magnetic pole passes over the pattern dot. The pattern dot is a minimum magnetization reversal unit bearing recorded information as magnetic information, and a gradient direction of the magnetization reversal field is substantially coincident between adjacent pattern dots.

In another general embodiment, a magnetic recording method for a pattern medium comprises controlling a tracking position of a recording head so that a stronger magnetic field is applied to a region where a magnetization reversal field of a pattern dot of an artificial pattern on a medium to record is relatively greater, and applying a recording magnetic field in synchronism with a timing when a trailing edge of the recording magnetic pole passes over the pattern dot to record. The pattern dot is a minimum magnetization reversal unit bearing recorded information as magnetic information, and the pattern dot has a gradient of a magnetization reversal field in a track transverse direction. Also, a region where the magnetization reversal field is relatively small is disposed on a side of the pattern dot having a previously recorded track, and a gradient direction of the magnetization reversal field is substantially coincident between adjacent pattern dots.

According to another general embodiment, a magnetic recording method for a pattern medium comprises locally heating a region where a magnetization reversal field of a pattern dot of an artificial pattern on a medium to record is relatively greater and applying a recording magnetic field to the pattern dot to record. The pattern dot is a minimum magnetization reversal unit bearing recorded information as magnetic information, and the pattern dot has a gradient of a magnetization reversal field in an in-plane direction of a substrate. Also, a gradient direction of the magnetization reversal field is substantially coincident between adjacent pattern dots.

According to some embodiments, a method for realizing the magnetization reversal due to a relatively small recording head magnetic field while maintaining the thermal stability of the pattern dots on the bit pattern medium occurs by introducing the exchange spring structure. A method for bonding two magnetic materials having different magnetization reversal fields in the direction perpendicular or parallel to the substrate plane has also been offered, as exemplified in the background art. However, for reducing the magnetic interference between the pattern dots owing to the magneto-static interaction, it is more effective to bond with exchange interaction the parts having different magnetic characteristics in an appropriate arrangement in the pattern dots into which this exchange spring structure is introduced, and also, using a recording and reproducing method suitable for the same pattern dots, in addition to introducing the exchange spring structure of the prior art into the pattern dots, aids in the effectiveness of the method.

The magnetic recording medium, according to one embodiment, is formed with a magnetic recording film having at least an artificial pattern structure on a roughly flat, non-magnetic substrate. Each magnetic particle dot (pattern dot) cut by patterning is the minimum magnetization reversal unit bearing the recording information as magnetic information. Herein, the pattern dot is one in which the magnetization reversal field has a gradient in one or more directions within the medium substrate plane, and the gradient direction of the magnetization reversal field is substantially coincident between the adjacent pattern dots. More specifically, the pattern dot is comprised of a plurality of magnetic material parts having different magnetic reversal fields, these magnetic material parts are joined in the in-plane direction of the substrate for the exchange interaction, and the arrangement of the plurality of magnetic material parts is common between the adjacent pattern dots.

Since the recording tracks are normally provided concentrically or helically in the magnetic recording medium, it is common that the pattern dots are arranged along the track. In such a recording medium structure with the recording tracks, it is desirable that the gradient direction of the magnetization reversal field is matched with the track transverse direction or the track direction, according to several embodiments.

If the gradient of the magnetization reversal field is provided in the track transverse direction, the part having smaller magnetization reversal field may be arranged on the left or right side of the track, according to some embodiments. On the other hand, if the gradient is provided in the track direction, the part having smaller magnetization reversal field may be arranged in an advancing direction of the recording head or its reverse direction (down-track direction). In some embodiments, it is more preferable that the part having smaller magnetization reversal field is arranged in the down-track direction. Further, the gradient of the magnetization reversal field can be provided both in the track direction and the track transverse direction of the recording medium, whereby it is possible to obtain the effects achieved by both gradients at the same time.

Also, in the bit pattern medium, it is preferable that the height of the pattern dot is smaller than the width or depth of the pattern dot, according to some embodiments. In the pattern dot having the exchange spring structure, if the exchange interaction acting between the part having greater magnetization reversal field and the part having smaller magnetization reversal field is too large, a desired non-uniform magnetization reversal mode is not realized, thereby it is not possible to make good use of the advantages of the structure. In some approaches, since the part having a greater magnetization reversal field and the part having smaller magnetization reversal field are joined in the in-plane direction of the substrate, the area of the joined face can be reduced by making the height of the pattern dot smaller, thereby lowering the exchange interaction to an appropriate strength. Also, as the height of the pattern dot is smaller, the magneto-static interaction is smaller, as previously described. Thereby, it is expected that the performance is improved owing to this effect. Further, if the height is greater relative to the spacing between the pattern dots, it is more difficult in that the parts having different magnetic characteristics are periodically arranged in the in-plane direction of the substrate, from the viewpoint of a manufacturing process, as will be described later.

Further, the advantages of the bit pattern medium having the above structure can be fully enjoyed by combining it with an appropriate recording method. In some approaches, the following recording method may be applied.

It is desirable that the relative position between the recording head and the recording medium is controlled to apply a greater head magnetic field to the part having a greater magnetization reversal field within the pattern dot at the moment of performing the recording on the pattern dot, according to some approaches. If the pattern dot has a gradient of the magnetization reversal field in the track transverse direction of the recording medium, it is preferable that the tracking is performed so that the recording magnetic pole may scan over the top of the side where the magnetization reversal field is greater, not in the center of the pattern dot, according to some approaches. Also, in a recording method called "shingled writing," as described in U.S. Pat. No. 6,185,063, the recording is performed using the magnetic field on the side face of the recording magnetic pole. In this case, it is preferable that the tracking position is matched with the gradient direction of magnetization reversal field of the pattern dot so that the part having greater magnetization reversal field may be arranged on the side closer to the center position of the recording magnetic pole, according to some approaches. If the pattern dot has a gradient of the magnetization reversal field in the track direction of the recording medium, the part having smaller magnetization reversal field is arranged in a down-track direction, and the recording is performed when the trailing edge of the recording magnetic pole passes over the top of the part having greater magnetization reversal field. In any of the above cases, though the recording magnetic field acting on the part having smaller magnetization reversal field is relatively small, the magnetization reversal occurs because its magnetization reversal field is small, playing a role of assisting the magnetization reversal in the part having a greater magnetization reversal field.

The above described embodiment can effectively function in combination with a thermally assisted magnetic recording method as described in JPO Pub. Nos. 3873744 and 4081485. In the thermally assisted magnetic recording method, the recording is performed by heating a predetermined area of the magnetic recording film and decreasing the magnetization reversal field in this area. Decreasing the magnetization reversal field corresponds to effectively increasing the recording magnetic field, and has substantially the same effect as that obtained in performing the recording by applying a greater magnetic field to the area to be heated. Accordingly, in the case where the thermally assisted recording method is applied to the bit pattern medium having the above structure, it is possible to make the good use of the advantages of the recording medium, according to some approaches, by deciding the position of heating means to heat primarily the part having a greater magnetization reversal field at room temperature, as in an ordinary magnetic recording.

Also, the magnetic recording and reproducing device, according to some approaches, comprises a magnetic recording medium having the patterned magnetic recording film, a medium driver for driving the magnetic recording medium, a magnetic head for performing the recording and reproducing operation for the magnetic recording medium, a head driver for positioning the magnetic head at a desired track position of the magnetic recording medium, and a controller for controlling each component. Further, it comprises a recording control mechanism for realizing the recording synchronization or tracking method corresponding to the recording method, according to some approaches, as described above.

It is possible to suppress the frequency of recording errors caused by the magneto-static interaction between the pattern dots without decreasing the thermal stability or reproduced signal strength of recording information by applying the recording method, according to some approaches, to the magnetic recording medium. As a result, various error margins in performing the recording on the pattern dots are expanded; thereby, the correct high density recording with the pattern dot as the information unit is enabled. Also, the intervals of the pattern dots can be reduced in accordance with the expanded error margins, whereby the magnetic recording and reproducing device having higher recording density can be provided.

Also, the magnetic recording medium, according to some approaches, may be manufactured by a relatively simple process change of adding a film making process for the magnetic film to the middle of a process for patterning the magnetic recording film.

The embodiments and effects are described below with reference to the drawings. These embodiments are intended to represent the general principles of the invention, but do not limit the invention in any way.

FIG. 1 schematically shows one example of the structure of a patterned magnetic recording film that is a feature of a magnetic recording medium according to one embodiment. In FIG. 1, the pattern dots 12a, 12b and 12c are aligned in a track direction on a substrate 11. Each of the pattern dots 12a, 12b and 12c is composed of a hard magnetic material part 13 having great anisotropy magnetic field $H_k$ and a soft magnetic material part 14 having relatively small anisotropy magnetic field $H_k$, in which both parts are bonded with exchange interaction. Usually, the anisotropy magnetic field $H_k$ is proportional to the magnetization reversal field. In FIG. 1, the hard magnetic material part having great magnetization reversal field is arranged in a head advancing direction, and the soft magnetic material part having small magnetization reversal field is arranged in a down-track direction.

A recording magnetic pole 15 performs the recording on the pattern dots while moving in the arrow direction from right to left in FIG. 1, according to some approaches. The pattern dot 12b in the center of FIG. 1 is being currently recorded, the pattern dot 12a on the right side is already settled in the recorded state, and the pattern dot 12c on the left side is recorded next. At the timing when the trailing edge of the recording magnetic pole 15 verges on the hard magnetic material part 13, a recording magnetic field is reversely applied in accordance with the information to be recorded to start the recording. Herein, the hard magnetic material part 13 is subject to a strong magnetic field from the trailing edge of the magnetic pole, and the soft magnetic material part 14 away from the trailing edge of the magnetic pole is subject to a relatively weak magnetic field. Since the magnetization reversal field of the soft magnetic material part 14 is small, the soft magnetic material part 14 gives rise to the magnetization reversal in the relatively weak magnetic field, giving a magnetic torque to the hard magnetic material part 13 through the exchange interaction. Owing to the synergy effect of this exchange interaction and a strong magnetic field from the recording magnetic pole 15, the hard magnetic material part 13 gives rise to the magnetization reversal, so that the recording on the pattern dot 12b is completed through a non-uniform magnetization reversal process.

Next, the reason why the pattern dots 12a and 12c are less likely to have influence on the current recording process will be described. Since the pattern dot 12c is directly under the recording magnetic pole 15, the magnetization is lined up in a direction of the recording magnetic field, with almost no influence on the current recording process. The magnetic information already recorded on the pattern dot 12a, which is uncorrelated with the magnetic information to be recorded from now, has the greatest influence. Particularly, the hard magnetic material part 13 of the pattern dot 12a has the strongest magneto-static interaction with the soft magnetic material part 14 of the pattern dot 12b. However, since the soft magnetic material part 14 has a small magnetization reversal field, the magnetization can be lined up in the direction of the recording head magnetic field, irrespective of the influence of magneto-static interaction, so that the magneto-static interaction on the soft magnetic material part 14 can be substantially ignored. Because the distance between the hard magnetic material part of the pattern dot 12b and the hard magnetic material part of the pattern dot 12a is large, the influence of the magneto-static interaction is relatively slight. Hence, the influence of the magneto-static interaction from the pattern dot 12a is suppressed by the recording medium and the recording method according to one embodiment.

Conversely, the current recording process is less likely to have influence on the magnetized state of the already recorded pattern dot 12a. Firstly, the position of the trailing edge of the recording magnetic pole 15 moves to almost the center of the pattern dot 12b, and is left away from the pattern dot 12a, according to some approaches. Accordingly, the magnetic field on the hard magnetic material part 13 of the pattern dot 12a is small. Secondly, the soft magnetic material part 14 of the pattern dot 12a is further away from the recording magnetic pole 15, whereby the magnetization reversal of the sot magnetic material part is less likely to occur. Hence, it is difficult that the non-uniform magnetization reversal of the overall pattern dot 12a owing to the action of the soft magnetic material part 14 is promoted in the already recorded pattern dot 12a.

A difference between the case where the soft magnetic material part is arranged in the down-track direction as shown in FIG. 1 and the opposite case where the hard magnetic material part is arranged in the down-track direction is described. According to a recording simulation made by the inventors using the computer, to make the magnetization reversal of the pattern dot, according to one embodiment, it was not required that the magnetic field of the same strength was applied to the hard magnetic material part 13 and the soft magnetic material part 14, but the exactly same magnetization reversal could be realized even if the magnetic field to the soft magnetic material part 14 was weaker. However, if the magnetic field to the hard magnetic material part 13 was insufficient, the magnetization reversal of the overall pattern dot did not occur, even if the magnetic field to the soft magnetic material part 14 was made too strong.

Figure 15:
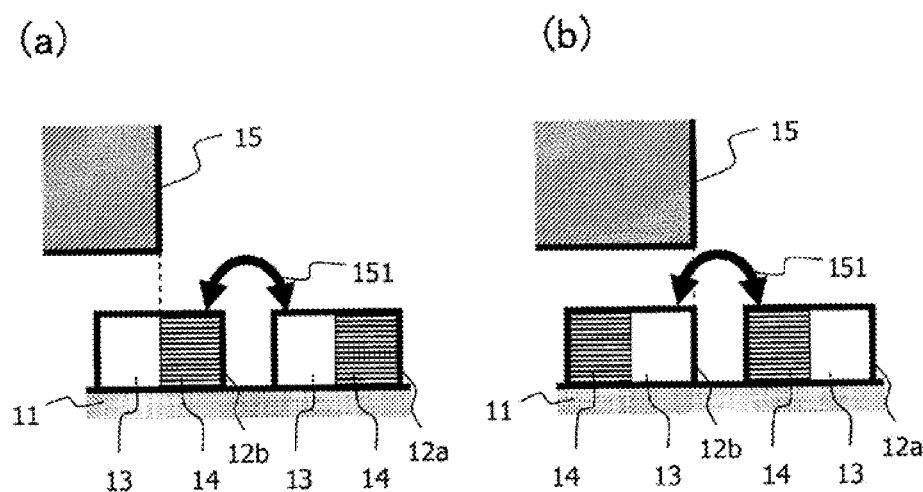
FIG. 15 is a view explaining the reason why more preferable recording characteristics are obtained in the case where the gradient of magnetization reversal field is coincident with the gradient of recording magnetic field.

FIG. 15(a) schematically shows how the recording is performed on the pattern dot in which the soft magnetic material part 14 is arranged in the down-track direction and FIG. 15(b) schematically shows how the recording is performed on the pattern dot in which the hard magnetic material part is arranged in the down-track direction. From the simulation result as previously described, a decrease in the recording magnetic field to the hard magnetic material part 13 is not allowed in any arrangement. Accordingly, FIGS. 15(a) and 15(b) show a state where the maximum magnetic field from the recording magnetic pole is applied to the hard magnetic material part 13, that is, the recording magnetic pole 15 is placed directly above the hard magnetic material part 13.

In either of FIG. 15(a) and FIG. 15(b), the pattern dot 12b being currently recorded receives a magneto-static field from the pattern dot 12a already recorded ahead, according to some approaches. In the case of FIG. 15(a), the magneto-static field 151 applied from the hard magnetic material part 13 of the already recorded pattern dot 12a to the soft magnetic material part 14 of the pattern dot 12b being recorded is the strongest. However, even if the static magnetic field required for the soft magnetic material part 14 varies more or less, there is no significant influence on the recording, whereby the recording interference between the pattern dots caused by the magneto-static field 151 is suppressed. On the other hand, in the case of FIG. 15(b), the magneto-static field 151 applied from the soft magnetic material part 14 of the already recorded pattern dot 12a to the hard magnetic material part 13 of the pattern dot 12b being recorded is the strongest. If the magneto-static field 151 to the hard magnetic material part 13 is large, the effect of suppressing the recording interference between the pattern dots is small, because the magnitude of the required magnetic field from a magnetic recording head is varied.

As described above, if the soft magnetic material part 14 is arranged in the down track direction of the hard magnetic material part 13, the effect of suppressing the recording interference between the pattern dots caused by the magneto-static interaction is great, whereby a recording synchronization timing margin can be expanded, according to some approaches. This can be apparent from the experiment results of FIG. 14, as will be described later.

Figure 2:
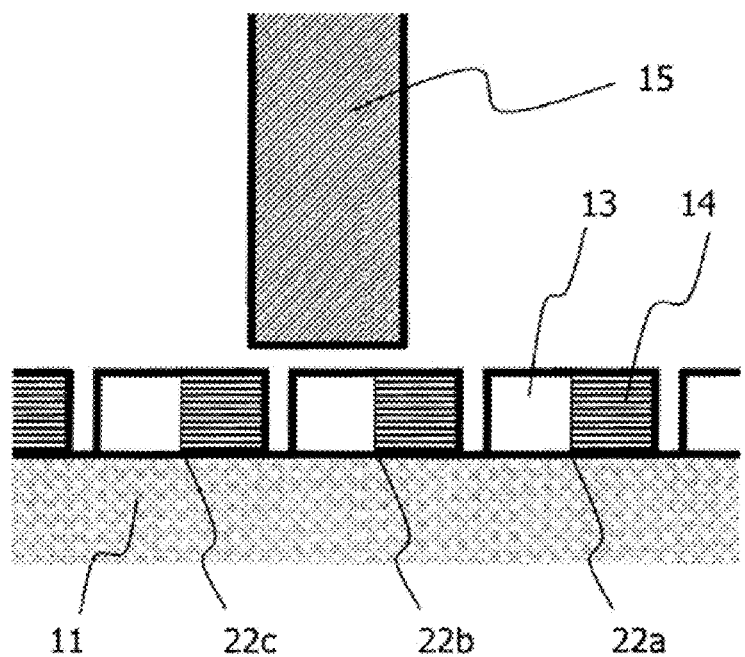
FIG. 2 is a cross-sectional view showing bit pattern medium and a recording magnetic pole of a magnetic head in a recording track transverse direction, according to one embodiment.

FIG. 2 shows an example of the magnetic recording medium in which the adjacent pattern dots arranged in different tracks have the same gradient of magnetization reversal field in the track transverse direction, according to some approaches. When the recording is performed on this recording medium, it is preferable that the center of the recording magnetic pole 15 is scanned over the top of the hard magnetic material part of the pattern dot 22b in the recording track in performing the recording. At the timing when the trailing edge of the recording magnetic pole 15 passes over the hard magnetic material part 13 of the pattern dot 22b, the recording magnetic field is applied from the recording magnetic pole 15. The recording magnetic field arising from directly under the recording magnetic pole 15 is the strongest, whereby the greatest magnetic field can be applied to the hard magnetic material part 13. Also, the soft magnetic material part 14 of the pattern dot 22b is subject to a relatively small magnetic field from the recording magnetic pole 15, so that the soft magnetic material part 14 having small magnetization reversal field gives rise to magnetization reversal ahead. Owing to a synergy effect of exchange interaction from the soft magnetic material part 14 and strong magnetic field applied from the recording magnetic pole 15, the magnetization reversal of the hard magnetic material part 13 occurs, so that the recording on the pattern dot 22b is completed through the non-uniform magnetization reversal process.

Herein, the magneto-static interaction from the pattern dots 22a and 22c arranged in the left and right tracks may possibly have influence on the recording process on the pattern dot 22b, according to some approaches. However, the influence of the magneto-static interaction can be suppressed by performing the recording in the arrangement as shown in FIG. 2. First of all, for the pattern dot 22c on the left side, the soft magnetic material part 14 is always lined up in the direction of recording magnetic field by the relatively small magnetic field from the recording magnetic pole 15. This soft magnetic material part 14 always gives only definite magneto-static interaction to the pattern dot 22b, not leading to an increase in the effective magnetization reversal field dispersion. Since no strong magnetic field is applied to the hard magnetic material part 13 of the pattern dot 22c, only the soft magnetic material part 14 in the pattern dot 22c temporarily gives rise to magnetization reversal, but the overall pattern dot 22c does not give rise to magnetization reversal. Hence, after the recording magnetic pole 15 passes, the soft magnetic material part 14 is lined up again in the magnetized direction of the hard magnetic material part 13. Also, since the magneto-static interaction from the pattern dot 22a on the right side is principally applied to only the soft magnetic material part 14 of the pattern dot 22b, there is less influence on the magnetization reversal field as a whole.

Also, the influence that the magnetic field for recording the pattern dot 22b has on the left and right adjacent tracks can be reduced by using the magnetic recording medium and the recording method, according to some approaches. Since the pattern dot 22a on the right side is away from the recording magnetic pole 15, the magnetization reversal of the pattern dot 22a is less likely to occur. Since there is great influence on the soft magnetic material part 14 in the pattern dot 22c on the left side, but the magnetic field on the crucial hard magnetic material part 13 is not sufficient, the magnetization reversal of the overall pattern dot 22c is less likely to occur. After all, the condition where the pattern dot 22 gives rise to magnetization reversal is that the maximum magnetic field is applied to the hard magnetic material part 13 and the magnetic field capable of magnetization reversal is also applied to the soft magnetic material part 14 in broad terms. Accordingly, the width of the tracking position to enable the recording is substantially decided by the width of the hard magnetic material part 13, and smaller than the width of the pattern dot. Hence, there is reduced possibility of falsely performing the recording on the pattern dot in the adjacent track.

Figure 3:
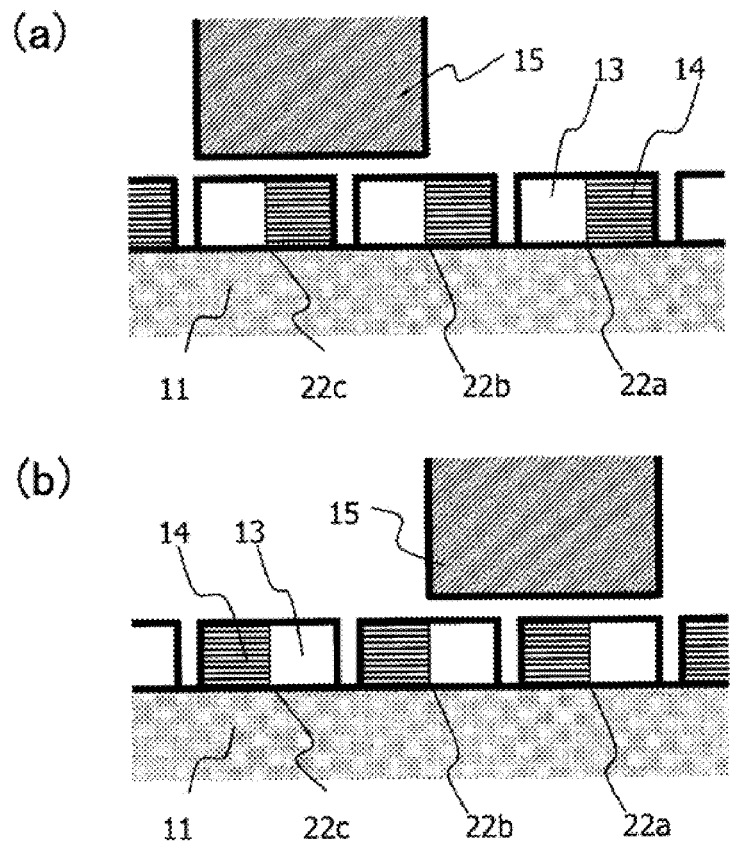
FIG. 3 is a cross-sectional view showing bit pattern medium and a recording magnetic pole of a magnetic head for shingled writing, according to one embodiment.

FIG. 3 shows the use of the recording magnetic pole 15 having larger width presupposing the shingled writing. In FIG. 3(*a*), though the recording is performed in order from the right track by a shingled writing method, with the hard magnetic material part 13 on the left side and the soft magnetic material part 14 on the right side at this time, the scanning position of the recording magnetic pole 15 is decided so that the great magnetic Field may be applied to the hard magnetic material part 13 of the pattern dot 22*b* to record, and the recording magnetic field from the recording magnetic pole 15 is applied at the timing when the trailing edge of the recording magnetic pole 15 passes over the pattern dot 22*b*, whereby the excellent recording can be realized. Also, in the case where the recording is performed in order from the left track, it is desirable to reversely arrange the hard magnetic material part and the soft magnetic material part, as shown in FIG. 3(*b*).

By adapting the gradient of the recording magnetic field to the gradient of the magnetization reversal field of the pattern dot in this way, it is possible to reduce the influence of magneto-static interaction from the already recorded track, with less possibility of false recording on the already recorded track, according to some approaches. Its reason can be understood by applying the logic for the track direction as described using FIG. 15 to the track transverse direction.

Figure 4:
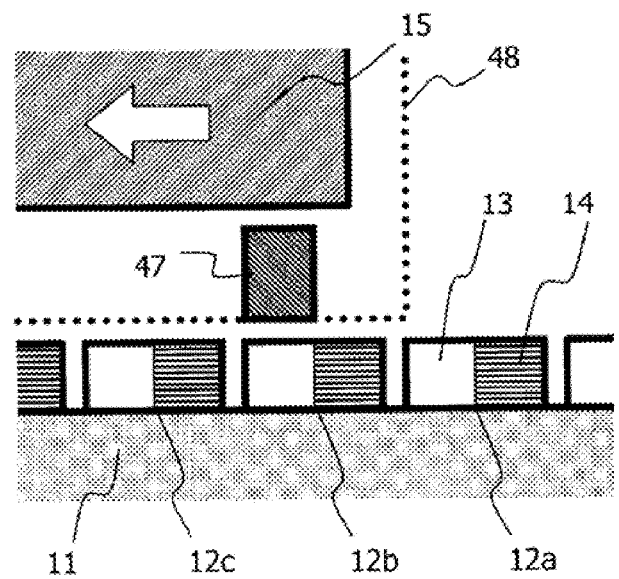
FIG. 4 is a cross-sectional view showing bit pattern medium and a recording magnetic pole of a magnetic head in making a thermal assisted magnetic recording, according to one embodiment.

FIG. 4 is a cross-sectional view of the magnetic recording medium in the track direction according to one embodiment, schematically showing a state where the thermal assist magnetic recording is performed on the magnetic recording medium. In the thermal assist magnetic recording, the recording magnetic pole 15 and a heat source 47 are mounted within a head slider 48 and moves together. The heat source 47 is realized by a near field light generation element, for example. The near field light generation element is composed of a metal thin film having a high electric conductivity, and obtained by patterning this thin film into the shape having an appropriate projection portion. If a laser beam having an appropriate plane of polarization is applied to this near field light generation element, plasma vibrations occur within the near field light generation element, emitting the near field light from the projection portion disposed so that the plasma vibrations may be concentrated. The heat source 47 capable of heating a very minute area can be realized by placing this projection portion at the position of the heat source 47.

In FIG. 4, the head slider 48 is moved from right to left as indicated by the arrow. From the recording magnetic pole 15, the magnetic field is applied over a relatively wide area. Accordingly, the recording magnetic field is applied to not only the pattern dot 12*b* to record, but also the adjacent pattern dots 12*a* and 12*c*. Since the recording magnetic field is insufficient to reverse the magnetization of the hard magnetic material part 13 of the pattern dot, the magnetization reversal of the overall pattern dot can not be made, but the magnetization of the soft magnetic material part 14 is rotated in the direction of recording magnetic field. In FIG. 4, the heat source 47 is disposed at the position near the bottom of the slider 48, and can heat a minute area on the magnetic recording medium surface. If the recording magnetic field is switched to the direction desired for recording at the timing when the heat source 47 passes over the top of the hard magnetic material part 13 of the pattern dot 12*b* to record to make heating, the magnetization reversal of the hard magnetic material part 13 occurs owing to a synergy effect of a decrease in the magnetization reversal field of the hard magnetic material part 13 and the exchange interaction from the soft magnetic material part 14, so that the recording is enabled.

Herein, the heating with the heat source 47 may be continuous or intermittent. If the heating is continuously performed, the pattern dots are heated in order in the track direction. However, if the thermal diffusion around the pattern dot is sufficiently rapid, it is cooled immediately after heating, whereby the desired recording is enabled by reversing the recording magnetic field in accordance with the timing when the heating of the hard magnetic material part 13 is made. If the heating is intermittently performed only on the hard magnetic material part 13 as the target, it is possible to suppress the influence of heat interference particularly in a situation where the thermal diffusion is insufficient, whereby the more preferable effect can be obtained.

Herein, for the pattern dot 12*b* to give rise to the magnetization reversal, it is requisite to heat the hard magnetic material part 13, according to some approaches. With the constitution of the magnetic recording medium, according to one embodiment, the hard magnetic material parts 13 are separated by a soft magnetic material part 14 and a gap between the pattern dots, whereby it is possible to suppress the thermal interference between the hard magnetic material parts 13. In the thermal assist magnetic recording method, recording interference between the adjacent pattern dots due to thermal diffusion is an important problem to be solved, whereby the higher density recording is enabled by applying the magnetic recording medium, according to one embodiment, and the thermal assist magnetic recording method.

Figure 16:
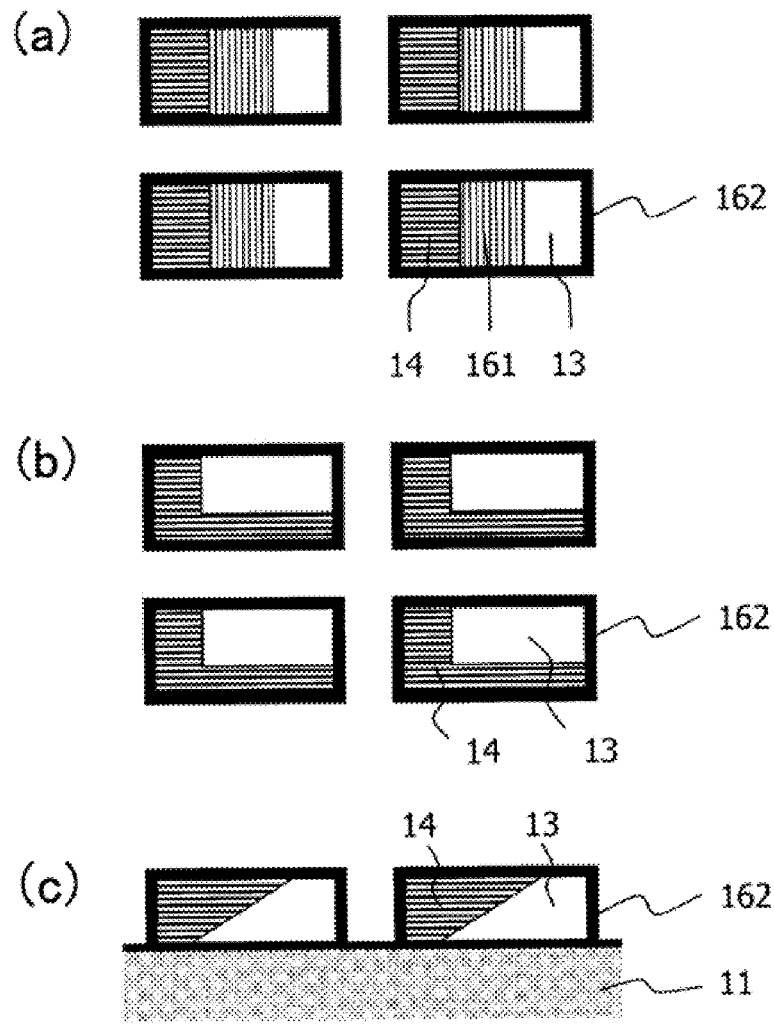
FIG. 16 is a view showing another form of pattern dots, according to one embodiment.

Further, according to one embodiment, the preferred effects can be obtained in various forms as shown in FIG. 16. FIG. 16(*a*) is an example in which one pattern dot 162 is composed of three parts, and the harder magnetic materials are arranged in order from the right and bonded with exchange interaction. The pattern dot 162 has a structure that the second hardest magnetic material part 161 is sandwiched between the hard magnetic material part 13 and the soft magnetic material part 14. The preferred effects, according to some embodiments, as described above, can be obtained by applying the recording head magnetic field around the part having the harder magnetic characteristic. In this way, though the number of parts making up the pattern dot is not limited in the invention, it is desirable that the magnetization reversal field may decrease or increase in the definite direction. FIG. 16(*b*) is an example of the pattern dot 162 in which the soft magnetic material part 14 is arranged like the L-character on two side faces of the hard magnetic material part 13. In this case, the effects, according to one embodiment, can be obtained both in the track direction and the track transverse direction. FIG. 16(*c*) is a vertical cross-sectional view of the bit pattern medium, in which the boundary between the hard magnetic material part 13 and the soft magnetic material part 14 of the pattern dot 162 is not vertical to the medium surface. In this constitution, the part having a greater film thickness ratio of the hard magnetic material part 13 is regarded as the harder part, and the maximum recording head magnetic field is applied to this part, whereby the preferred effects, according to some approaches, can be exhibited.

Figure 5:
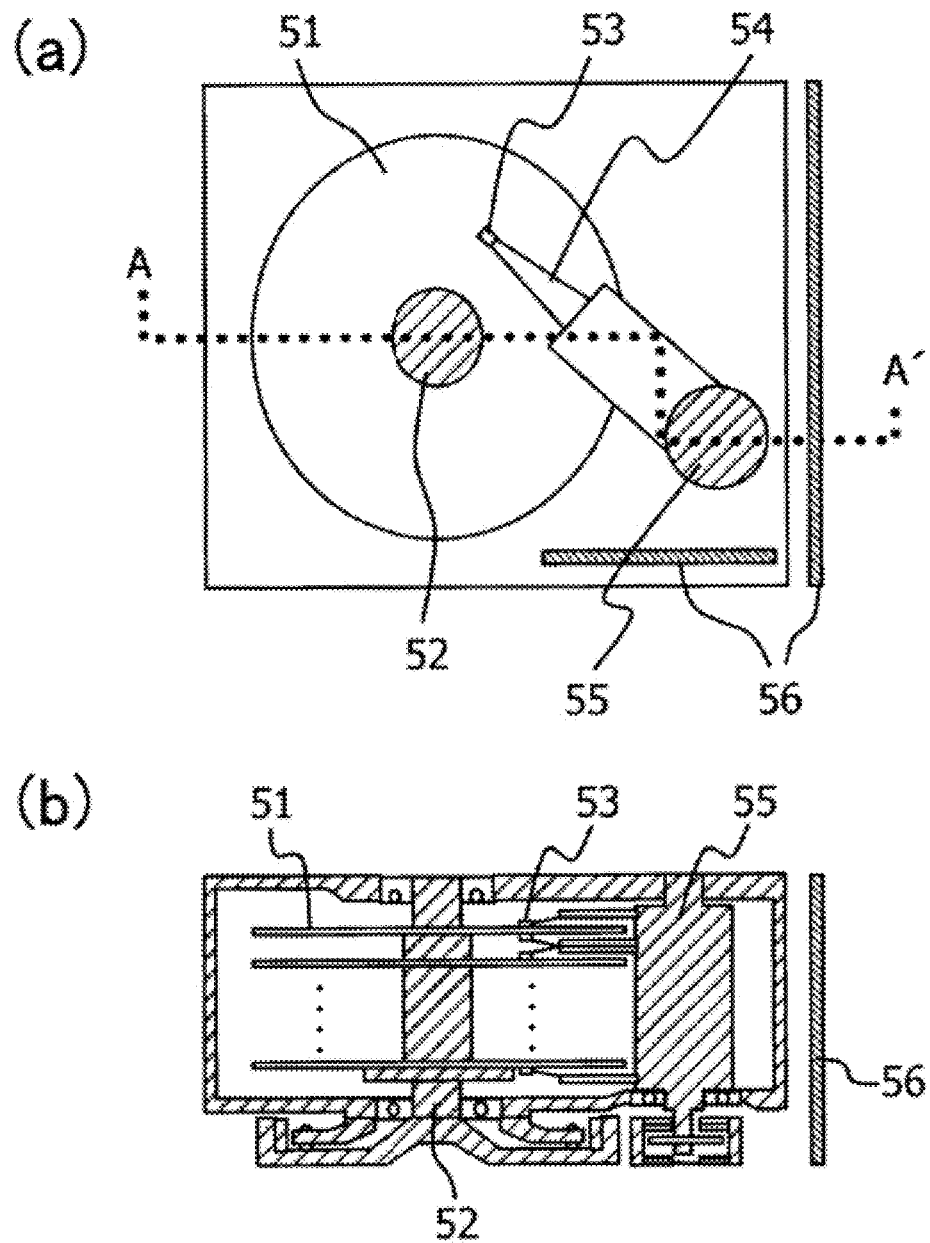
FIG. 5 is a schematic view of a magnetic recording and reproducing device, according to one embodiment.

FIG. 5 is a schematic view showing the structure and the components of a magnetic recording and reproducing device according to one embodiment. A magnetic recording medium 51 and the magnetic recording method according to some embodiments are applied to this magnetic recording and reproducing device.

The magnetic recording medium 51 is secured to a spindle motor 52 that rotates and drives it and is rotated and driven at a predetermined rotation rate. A magnetic head 53 that performs the recording and reproducing operation by accessing the magnetic recording medium 51 is mounted at the top end of a suspension 54 made from a metallic leaf spring, and the suspension 54 is further attached to an actuator 55 for controlling the position of the magnetic head. A controller 56 comprising an electronic circuit performs the operation control of the recording medium and the head and the processing for a recording and reproducing signal.

Some specific embodiments are described below.

In Embodiment 1, on a cleaned tempered glass substrate 61 for the magnetic disk, an $AlTi_{50}$ amorphous alloy layer (the subscript figure indicates the atomic percentage for the percentage of a constituent of element in the alloy, the same below) having a thickness of 10 nm, an $FeCo_{34}Ta_{10}Zr_5$ soft magnetic amorphous film having a thickness of 50 nm, an $NiW_8$ alloy layer having a thickness of 7 nm and an Ru layer having a thickness of 10 nm, were formed in this order by a DC sputtering method. An artificial superlattice multilayered film 62 in which a Co layer and a Pd layer are alternately laminated on the Ru layer were formed for fifteen cycles. Herein, the thickness of each Co layer was 0.4 nm and the thickness of each Pd layer was 0.6 nm. Accordingly, the total film thickness of this $[Co/Pd]_{15}$ artificial superlattice film was 15 nm. Further, a carbon layer 63 having a thickness of 20 nm and a Ta layer 64 having a thickness of 3 nm were formed. The $[Co/Pd]_{15}$ artificial superlattice film indicates an easy axis of magnetization in the direction perpendicular to the film plane, and the anisotropic magnetic field $H_k$ measured using a torque magnetometer was about 1640 kA/m. FIG. 6(a) shows a state after forming the thin film. For simplicity, the structure of the Ru layer and the lower part is not shown in FIG. 6(a).

A photo-resist 65 having a thickness of 30 nm was coated on the Ta layer 64 (FIG. 6(b)). Further, the photo-resist 65 was processed by ER (electron beam) lithography (FIG. 6(c)). The Ta layer 64 was selectively removed by performing a reactive ion etching (RIE) using a $CF_4$ gas with the remaining resist pattern as an anti-etching mask (FIG. 6(d)). Further, the carbon layer 63 was selectively removed by performing the RIE using the oxygen gas with the Ta layer as an anti-etching mask (FIG. 6(e)). Then, the $[Co/Pd]_{15}$ artificial superlattice multilayered film 62 having a thickness of 15 nm was etched by performing the ion milling using argon ion (FIG. 6(f)).

Herein, a $CoCr_{23}Pt_{12}$ alloy layer 66 was made using the DC sputtering method again (FIG. 6(g)). At this time, the CoCrPt alloy layer 66 was deposited on the side face and the upper face of the patterned $[Co/Pd]_{15}$ artificial superlattice multilayered film 62 by depositing the sputter particles from the slightly oblique direction. The CoCrPt alloy film 66 deposited on the top was cut by the ion milling again, the remaining carbon layer 63 was removed by the RIE using the oxygen gas, and the residue was cleaned, whereby the patterned magnetic recording film was completed (FIG. 6(h)). Finally, a cap layer 67 was formed by making a film of carbon nitride in a mixed gas of argon and nitrogen by the DC sputtering method.

Separately, the anisotropy magnetic field $H_k$ of the $CoCr_{23}Pt_{12}$ alloy layer made on the Ru under-layer was measured to be about 440 kA/m, which was about one-quarter of the anisotropy magnetic field Hk (about 1640 kA/m) of the $[Co/Pd]_{15}$ artificial superlattice multilayered film 62. Accordingly, the $[Co/Pd]_{15}$ artificial superlattice multilayered film 62 functions as the hard magnetic material part and the $CoCr_{23}Pt_{12}$ alloy layer 66 functions as the soft magnetic material part in the fabricated dot pattern.

Figure 6:
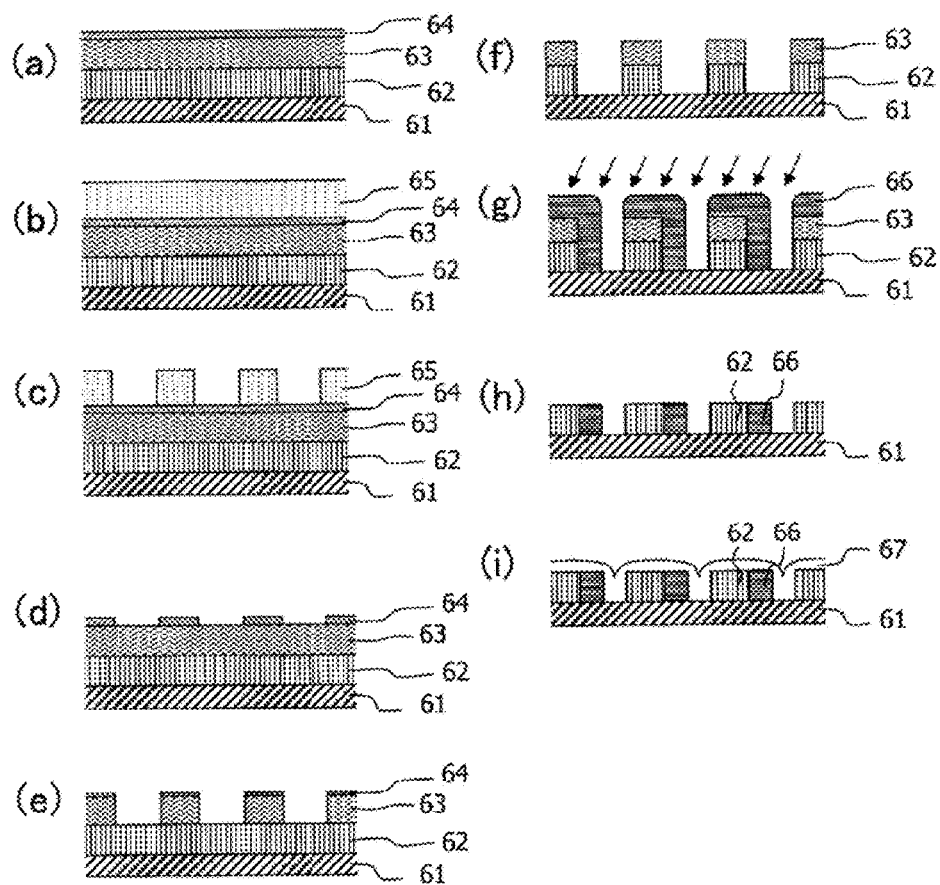
FIG. 6 is an explanatory view of a process for fabricating a bit pattern medium, according to one embodiment.
Figure 7:
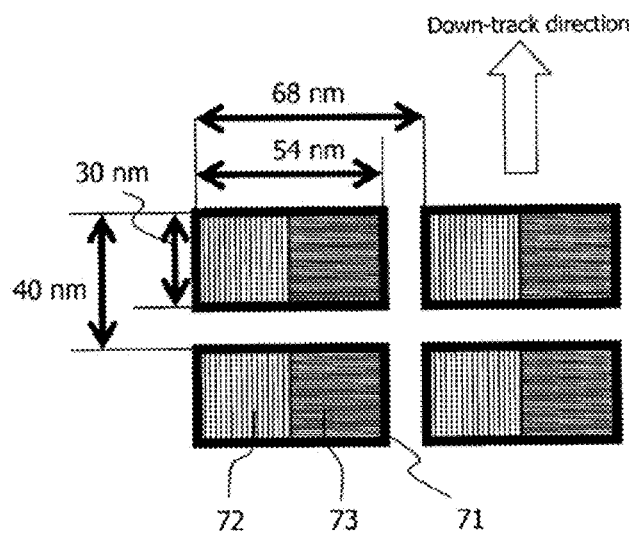
FIG. 7 is a view showing the shape, structure, and arrangement of pattern dots in a bit pattern medium according to Embodiment 1.

Through the procedure as shown in FIG. 6, the recording tracks composed of pattern dots were fabricated with a width of about 0.01 mm in a ring-like area having a radius of 22 mm on the medium substrate. The pattern dots were actually fabricated only in the area having a length of about 3 mm on the track. Besides, a servo pattern used for tracking servo was formed by concavity and convexity on the medium substrate. FIG. 7 schematically shows the size and arrangement of the pattern dots fabricated in this embodiment. The design size of a pattern dot 71 was a rectangular parallelepiped of 54 nm×30 nm, and a short side direction of the pattern dot 71 was in the tracking direction. A hard magnetic material part 72 and a soft magnetic material part 73 are joined in a long side direction (track transverse direction) of the pattern dot 71, in which the ratio of the hard magnetic material part 72 and the soft magnetic material part 73 was half-and-half. The pitch of the pattern dots 71 was 68 nm in the pattern dot long side direction and 40 nm in the pattern dot short side direction. A magnetic hysteresis loop (Kerr loop) in the area where the pattern dots were formed was measured, using a polar Kerr magnetometer, by applying a magnetization in the direction perpendicular to the substrate plane of the magnetic recording medium. A coercive force $H_c$ of the magnetic recording medium was estimated to be about 430 kA/m from the measured Kerr loop.

Figure 17:
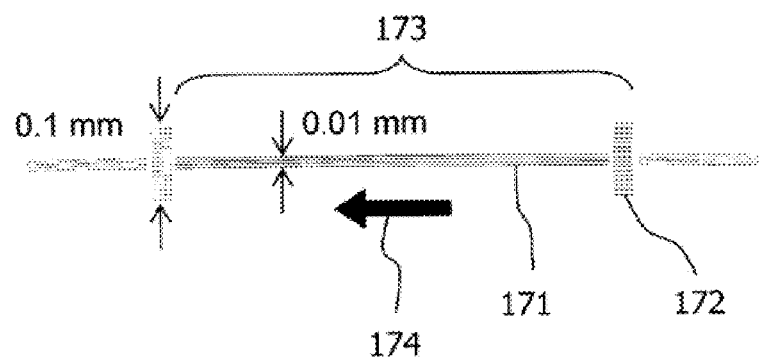
FIG. 17 is a schematic view showing the arrangement of recording track and servo pattern, according to one embodiment.

FIG. 17 schematically shows the arrangement of the fabricated recording track and servo pattern. A recording track 171 is divided into a number of recording sectors 173 in one circuit, and a servo pattern 172 is arranged at the top of each recording sector 173. The magnetic head detects the servo pattern 172 at the scanned position using the reproducing element, and reads the sector position information and the track position information recorded within the servo pattern. Access to the intended sector/track position was made using this servo information. The minute shift amount from the center position of the intended recording track was controlled using the precise information on the track position. A burst pattern for generating a clock signal is arranged in the rear part within the servo pattern 172. The recording and reproducing timings were decided using the clock signal generated based on the burst pattern. The minute shift amount of the recording magnetic field switching location was controlled by appropriately shifting the clock signal within a recording control circuit to change the recording synchronization timing. An arrow 174 in the figure indicates a head scanning direction.

As a comparative example for comparison with this embodiment, a magnetic recording medium having a uniform anisotropy magnetic field (without having the exchange spring structure) over the entire pattern dot was fabricated. This comparative example has the same pattern dot structure and arrangement as the medium shown in the embodiment 1, in which the pattern dot was composed of $CoCr_{21}Pt_{18}$ alloy, the anisotropy magnetic field $H_k$ was about 950 kA/m, and the coercive force $H_c$ was 415 kA/m.

Figure 8:
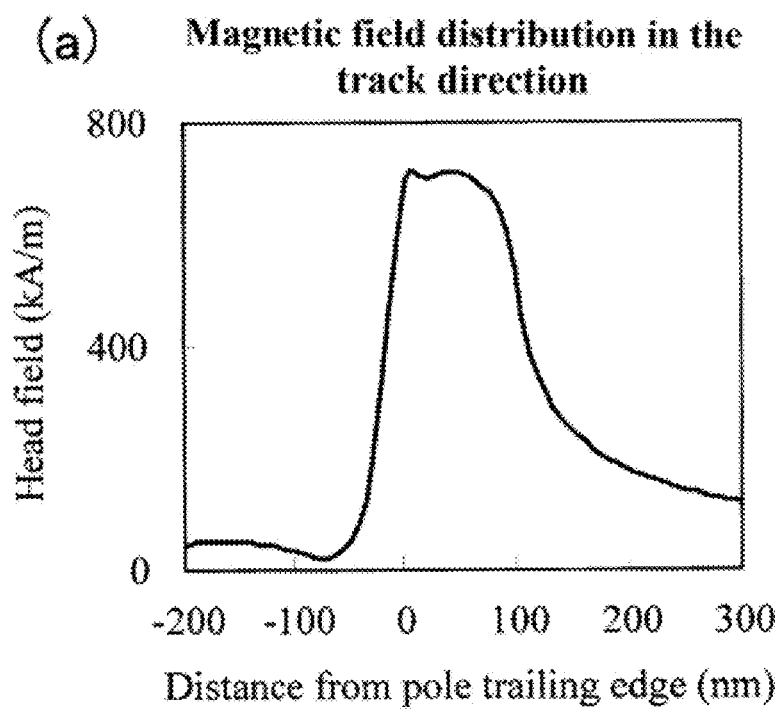
FIG. 8 is a view showing a recording magnetic field distribution of the magnetic head, according to one embodiment.
Figure 8:
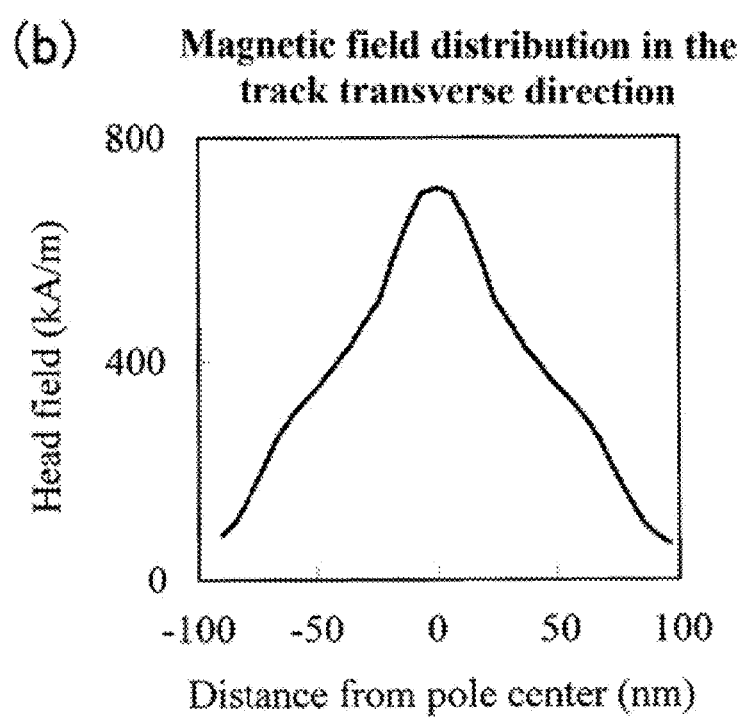

A recording and reproducing experiment was conducted by mounting the recording medium of this embodiment and the recording medium of the comparative example on a spinstand. The recording magnetic pole of the magnetic head used in the experiment has a wedge-like shape in which the magnetic pole width at the trailing edge is about 40 nm, and the length in the track direction is about 120 nm, with the larger width toward the trailing edge. Also, a shield was disposed to surround the recording magnetic pole from the trailing edge to the side portion, in which the distance from the trailing edge to the shield was 20 nm, and the distance from the side portion to the shield was 60 nm. Also, the recording magnetic pole has a shape (flared) like a fan at the position about 30 nm away from the slider bottom face. The reproducing element used a tunnel magnetic resistance (TMR) sensor having a shield interval of 32 nm and an electrode interval of 65 nm. FIG. 8 shows a head recording magnetic field distribution estimated by computation.

FIG. 8(a) shows a recording magnetic field distribution in the track direction at the center position of the magnetic pole in the track transverse direction in terms of the distance from the trailing edge of the magnetic pole. The maximum recording magnetic field was about 720 kA/m, rapidly decreasing from the trailing edge of the magnetic pole to be about one-half at the position of −20 nm. FIG. 8(b) shows a recording magnetic field distribution in the track transverse direction at the location indicating the maximum magnetic field near the trailing edge of the magnetic pole. The width where the recording magnetic field strength is half of the maximum value is 100 nm, quite larger than the width of the trailing edge of the magnetic pole, with a possible risk that there is great influence on the adjacent tracks.

Figure 9:
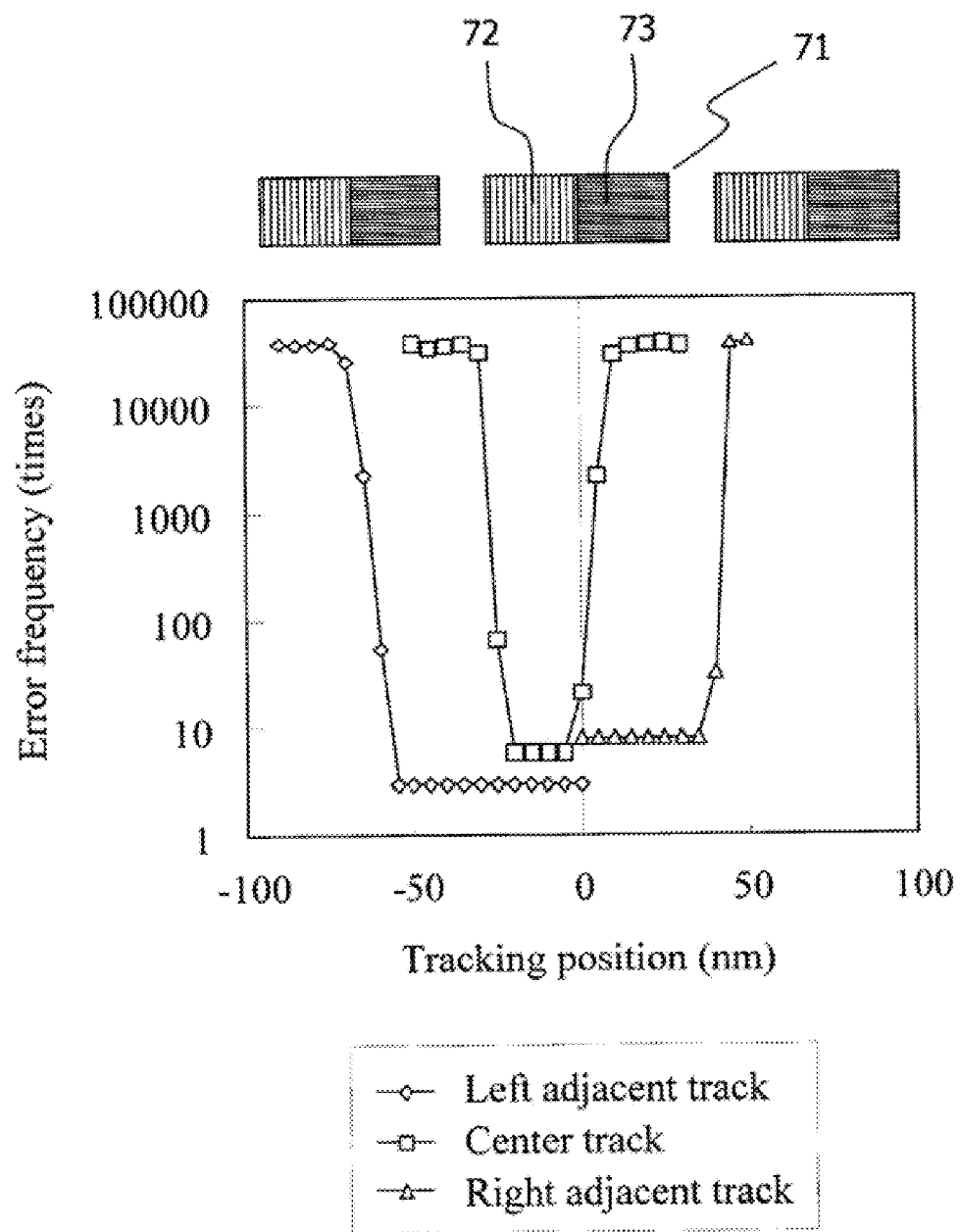
FIG. 9 is a view showing a relationship between the tracking position of the magnetic head during recording and the recording error frequency of the target recording track and the adjacent tracks in a bit pattern medium, according to Embodiment 1.

FIG. 9 shows the results of measuring the frequency of recording error in performing the recording while changing the tracking position in a pattern dot row. The experiment procedure is as follows. First of all, the predetermined data series is recorded in the adjacent tracks, and the information of this data series is stored. Next, the recording is performed in the center track, and the recording error frequency is measured at the center track. Next, the left and right adjacent tracks are reproduced, and collated with the stored information of the data series, whereby the recording error frequency at the adjacent tracks is decided. In performing the recording in each track, the recording synchronization timing with the smallest recording error investigated beforehand was employed. Also, the center position (origin) of the center track in FIG. 9 was decided from the position where the recording error frequency is the smallest in performing the recording in the comparative example. For reference, the arrangement of the pattern dot 71 is schematically shown on the top of the graph in FIG. 9.

In FIG. 9, the recording error of the center track indicates the least error frequency where the tracking position is from −5 nm to −20 nm. It can be understood that if the magnetic pole center scans the top of the hard magnetic material part 72, the correct recording is enabled. Though the least recording error frequency is not zero, this is a stationary error caused by a pattern formation failure. On the other hand, if the magnetic pole center scans the top of the soft magnetic material part 73, the recording can be hardly performed, whereby the recording error frequency increased greatly. The same thing occurs with an erase error in the adjacent track. That is, if the magnetic pole center scanned the top of the hard magnetic material part 72 in the adjacent track, erasing of the adjacent track occurred, whereby the error frequency increased greatly. In this way, in this embodiment, the soft magnetic material part 73 acts as a margin for the adjacent erase error.

Figure 10:
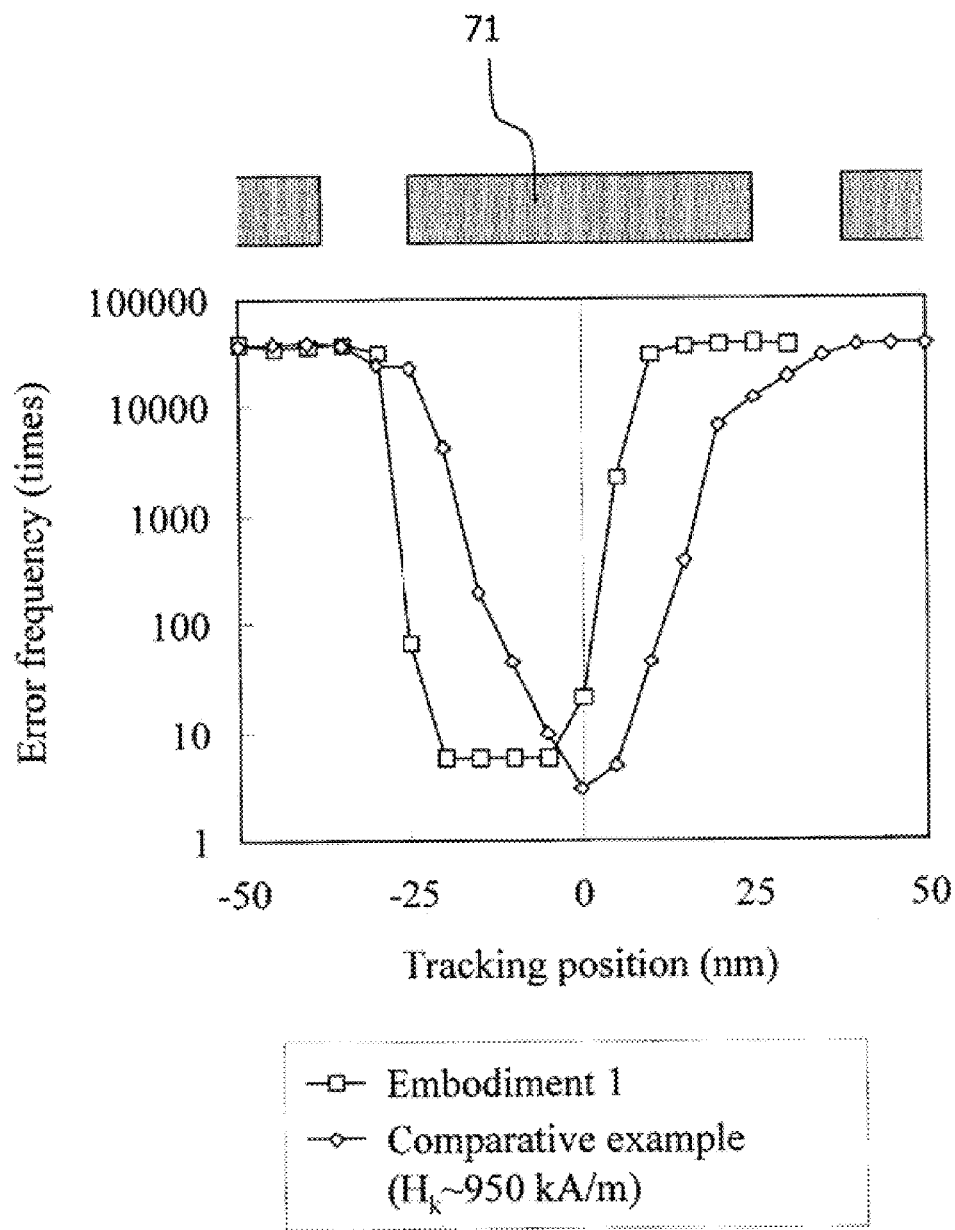
FIG. 10 is a view showing a relationship between the tracking position of the magnetic head during recording and recording error frequency in a bit pattern media, according to Embodiment 1, and a comparative example.

FIG. 10 shows the relationship between the tracking position and the recording error frequency by comparison between the recording medium of the embodiment and the recording medium of the comparative example. Herein, the current amount to the recording head was slightly adjusted to match the strength of recording magnetic field with the optimal recording sensitivity of each the magnetic recording medium. The experiment results of this embodiment are the same as those shown in FIG. 9. In the comparative example, when the scanning position of the magnetic pole center slightly deviated from the center of pattern dot, the increasing recording errors were remarkable, so that a tracking misregistration margin as in this embodiment could not be obtained. The reason why the tracking misregistration margin is great in this embodiment may be conceivably that the influence of magneto-static interaction from the adjacent track is successfully suppressed. On the other hand, in the comparative example, the tracking misregistration margin is not only small, but also the position where the value of the recording error is saturated, namely, the position where the recording can not be performed at all, is greatly separated from the track center, which indicates the weakness of erasing the adjacent track.

Figure 11:
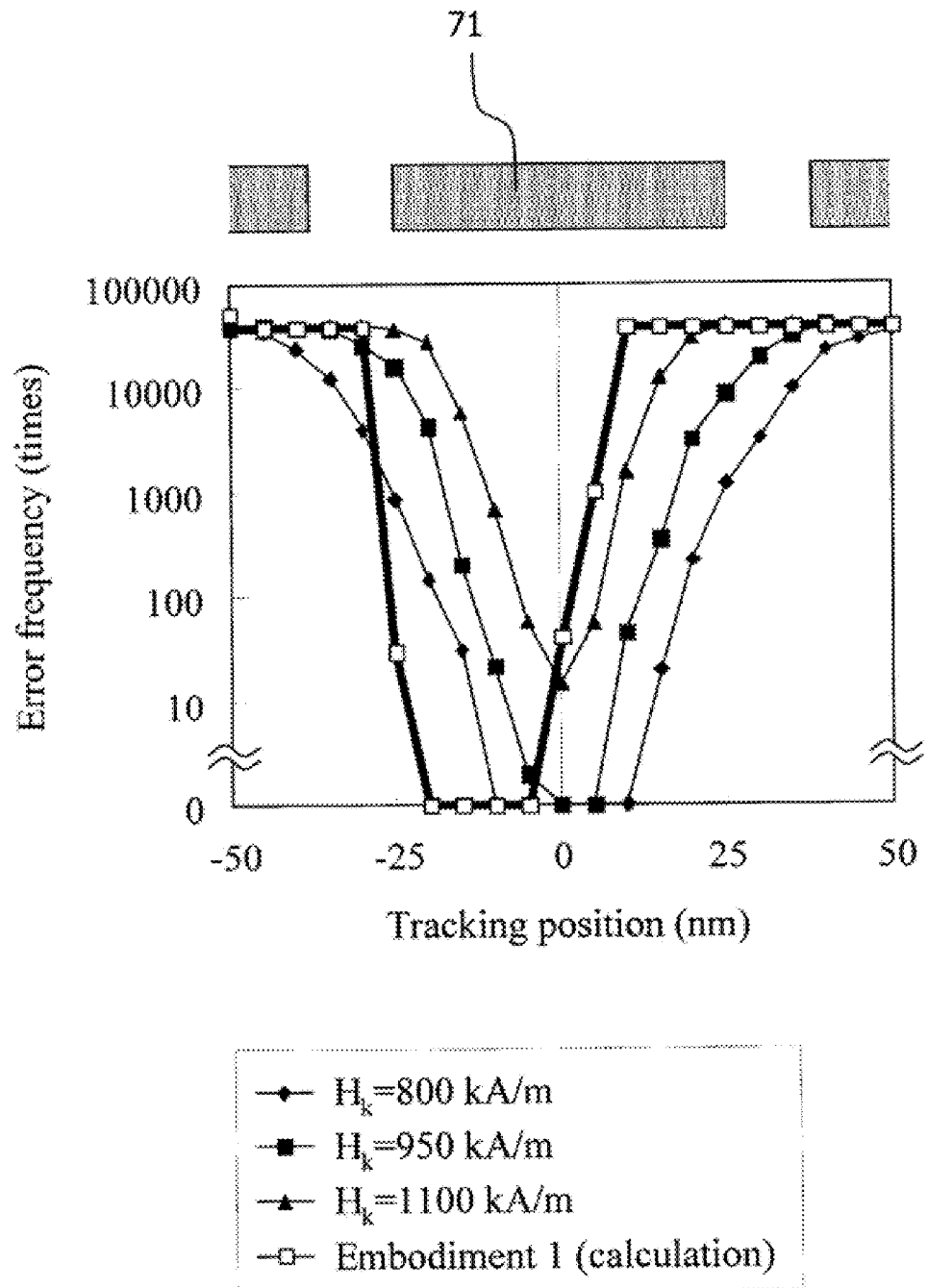
FIG. 11 is a view showing results of computing, using recording simulation, a relationship between the tracking position of the magnetic head during recording and the recording error frequency in a bit pattern media, according to Embodiment 1, and the comparative example.

A recording simulation of the magnetic recording medium having the structure of this embodiment was performed using the computer. Also, the same examination was made in the case where the anisotropy magnetic field $H_k$ of the pattern dot in the comparative example was changed from 800 to 1100 kA/m. FIG. 11 shows the results. The simulation results of this embodiment had the good coincidence with the experiment results (the minimum recording error frequency was zero because of simulation). In the comparative example, if $H_k$ is decreased to 800 kA/m, the tracking misregistration margin of the recording error frequency can be expanded to the extent of this embodiment, but conversely is strongly subject to the influence from the adjacent track. On the contrary, if $H_k$ is increased to 1100 kA/m, the influence from the adjacent track can be reduced, but when the magnetic pole center scanned the center of the pattern dot, the recording magnetic field was insufficient, so that the recording error increased.

As described above, the tracking misregistration margin for the recording error can be increased and the problem with erasing of the adjacent track can be greatly relieved, using the exchange spring structure in the substrate plane direction as in this embodiment, and performing the tracking to scan the position of the hard magnetic material part. With this embodiment, the track density can be further increased, and the higher areal recording density of the magnetic recording device can be realized.

Figure 12:
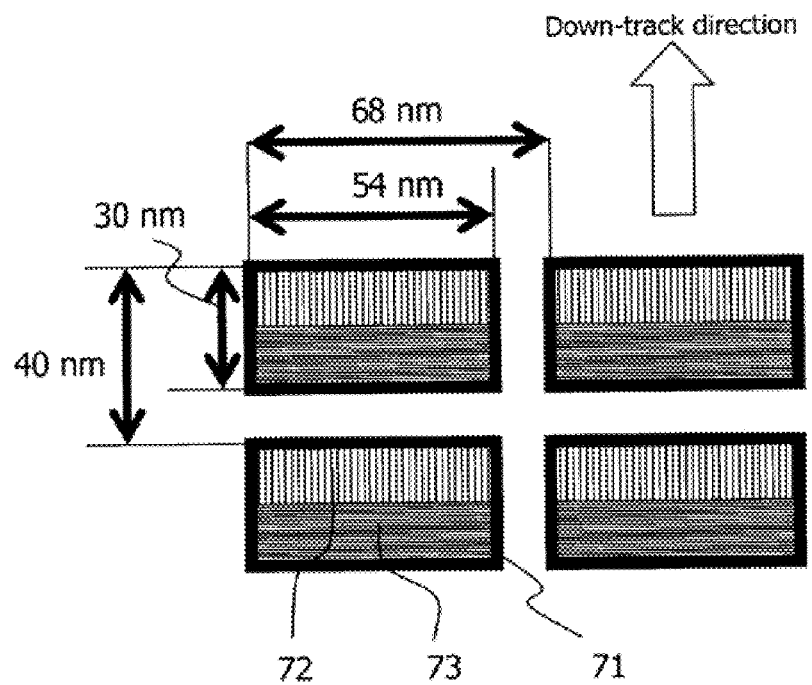
FIG. 12 is a view showing the shape, structure, and arrangement of pattern dots in a bit pattern medium, according to Embodiment 2.

In Embodiment 2, a bit pattern magnetic recording medium was manufactured, using the same manufacturing process as in the embodiment 1. FIG. 12 schematically shows the size and arrangement of the pattern dots fabricated in the embodiment 2.

In Embodiment 2, the pattern dots were fabricated so that the hard magnetic material part 72 and the soft magnetic material part 73 may be arranged in the short side direction (track direction) of the pattern dot 71. The ratio of the hard magnetic material part 72 and the soft magnetic material part 73 was half-and-half as in the embodiment 1. A magnetic hysteresis loop (Kerr loop) in the area where the pattern dots were formed was measured, using a polar Kerr magnetometer, by applying a magnetization in the direction perpendicular to the substrate plane of the magnetic recording medium. A coercive force $H_c$ of the magnetic recording medium was estimated to be about 520 kA/m from the measured Kerr loop.

Figure 14:
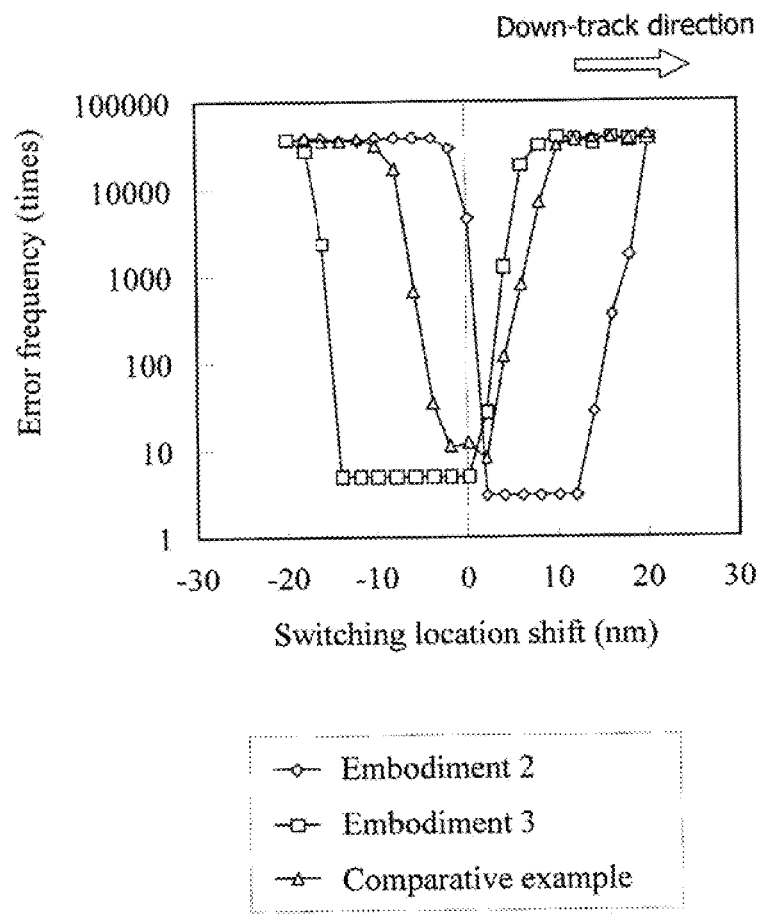
FIG. 14 is a view showing a relationship between the switching location shift amount of the recording magnetic field and the recording error frequency in the bit pattern magnetic recording media, according to Embodiments 2 and 3, and the comparative example.

A recording and reproducing experiment was conducted on the medium of this embodiment, using the same method as in the embodiment 1. In the embodiment 2, the tracking position was controlled so that the center of the recording magnetic pole might pass near the center of the pattern dot, and a change in the recording error frequency was measured by changing the recording synchronization timing. FIG. 14 shows the results. Also, the same measurements were made for the comparative example used in the embodiment I, and the measurement results are also shown in FIG. 14. The horizontal axis of FIG. 14 represents the shift amount of the recording magnetic field switching location in the down-track direction. The switching location is more forward toward the right (the timing is earlier). The origin was the switching location (timing) at which the reproducing signal indicates the maximum value during recording in the comparative example.

In view of data of the comparative example in FIG. 14, the recording error frequency is as small as about 10 near the origin, but if the switching location is shifted 4 nm from this optimal position, the increasing recording errors are remarkable, in which the shift amount margin is small. If the switching location is shifted to the right, the recording error occurs principally because the information of the pattern dot recorded ahead is overwritten. If the switching location is shifted to the left, the recording error occurs principally because the recording magnetic field for performing the recording on the target pattern dot is insufficient. One of the causes of such recording error is the spread magnetization reversal field distribution caused by the magneto-static interaction. On the other hand, the minimum recording error frequency is indicated from 2 nm to 12 nm in the embodiment 2, whereby the shift amount margin was larger than the comparative example. Since the hard magnetic material part 72 is located on the down-track side, the optimal recording position exists on the slightly right side of the comparative example. The minimum frequency of the recording error does not reach zero, but this is considered to be a stationary error due to a pattern formation failure.

The first reason why such a wide shift amount margin is obtained is that the position of the hard magnetic material part 72 of the pattern dot recorded ahead is left away from the recording magnetic pole, so that it is difficult that the information of the pattern dot recorded ahead is overwritten. Also, the second reason is that only the magnetization of the soft magnetic material part of the pattern dot recorded ahead is changed to the direction of the recording magnetic pole, so that the influence of the magneto-static interaction on the magnetization reversal field is suppressed. In the above way, the recording and reproducing performance of the bit pattern medium could be improved by the magnetic recording medium of this embodiment.

Figure 13:
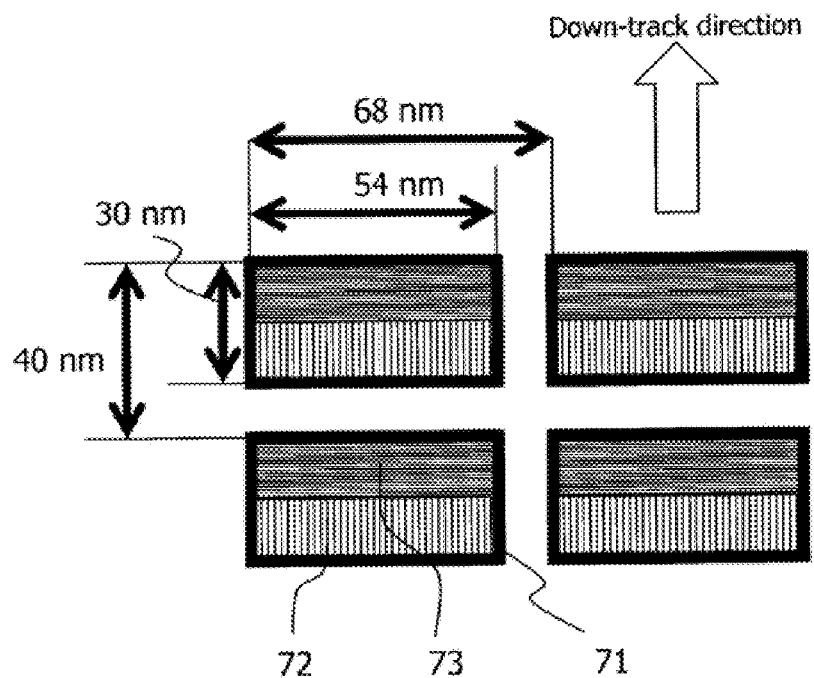
FIG. 13 is a view showing the shape, structure, and arrangement of pattern dots in a bit pattern medium, according to Embodiment 3.

In Embodiment 3, a bit pattern magnetic recording medium was manufactured, using the same manufacturing process as in the embodiment 1. FIG. 13 schematically shows the size and arrangement of the pattern dot 71 manufactured in the embodiment 3. Though the hard magnetic material part 72 and the soft magnetic material part 73 are joined in the track direction in the embodiment 3, the pattern dot was fabricated so that the soft magnetic material part might be arranged in the down-track direction in the embodiment 3, unlike the embodiment 2. A coercive force $H_c$ of the magnetic recording medium is about 510 kA/m, whereby it is considered that almost the same pattern dot as in the embodiment 2 was obtained.

A recording and reproducing experiment was conducted on the medium of this embodiment, using the same method as in the embodiment 2. FIG. 14 shows the measurement results of this embodiment, together with the measurement results of the embodiment 2 and the comparative example. In this embodiment, the least recording error frequency is indicated in a very wide range from −14 nm to 0 nm, whereby the quite wider shift amount margin could be obtained than the comparative example and the embodiment 2.

As will be clear from the above, if each pattern dot has a gradient of the magnetization reversal field in the in-plane direction of the substrate, and the gradient is coincident with that of the recording magnetic field as in this embodiment 3, the widest shift amount margin could be obtained. In the normal magnetic recording method, since the recording is settled at the trailing edge of the recording magnetic pole, it is preferable that the soft magnetic material part is arranged in the down-track direction of the pattern dot for the recording track direction.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
a substrate; and
a magnetic recording film having an artificial pattern including pattern dots cut by patterning positioned above the substrate;
wherein an individual pattern dot is a minimum magnetization reversal unit bearing recorded information as magnetic information,
wherein each pattern dot has a gradient of a magnetization reversal field in an in-plane direction of the substrate,
wherein a gradient direction of the magnetization reversal field is substantially coincident between adjacent pattern dots,
wherein an easy axis of magnetization for magnetic material within the pattern dot is perpendicular to a substrate plane, and
wherein each pattern dot is comprised of two magnetic materials having different magnetization reversal field values, the two magnetic materials being positioned adjacent each other in the in-plane direction and in direct contact with each other.

2. The magnetic recording medium according to claim 1, further comprising a gradient of the magnetization reversal field in a track direction, wherein a region where the magnetization reversal field is small is positioned in a down-track direction of the pattern dot.

3. The magnetic recording medium according to claim 1:
wherein a region where the magnetization reversal field is relatively small is made of a material having a relatively small anisotropy magnetic field, and
wherein a region where the magnetization reversal field is relatively large is made of a material having a relatively large anisotropy magnetic field.

4. The magnetic recording medium according to claim 3:
wherein the region where the magnetization reversal field is relatively small comprises a greater amount of the material having a relatively small anisotropy magnetic field in a thickness direction, and
wherein the region where the magnetization reversal field is relatively large comprises a greater amount of the material having a relatively large anisotropy magnetic field in the thickness direction.

5. The magnetic recording medium according to claim 1, further comprising a gradient of the magnetization reversal field in a track transverse direction.

6. The magnetic recording medium according to claim 1, further comprising a gradient of the magnetization reversal field in a track direction.

7. The magnetic recording medium according to claim 6, wherein a region where the magnetization reversal field is small is positioned in a down-track direction of the pattern dot.

8. The magnetic recording medium according to claim 1, further comprising a gradient of the magnetization reversal field in a track direction and in a track transverse direction.

9. The magnetic recording medium according to claim 1, wherein the pattern dot has a common magnetic orientation across all portions of the gradient.

10. The magnetic recording medium according to claim 1:
wherein the pattern dot comprises a plurality of magnetic material parts numbering greater than two, wherein the plurality of magnetic material parts are different in the magnetization reversal field,
wherein the plurality of magnetic material parts are joined in the in-plane direction of the substrate, and
wherein the arrangement of the plurality of magnetic material parts different in the magnetization reversal field is common between the adjacent pattern dots.

11. The magnetic recording medium according to claim 1, further comprising a third magnetic material positioned adjacent the two magnetic materials in the in-plane direction, the third magnetic material having a relatively smaller anisotropy magnetic field than both of the two magnetic materials.

12. The magnetic recording medium according to claim 1, further comprising a gradient of the magnetization reversal field in a track direction and in a track transverse direction,
wherein an easy axis of magnetization for magnetic material within the pattern dot is perpendicular to a substrate plane,
wherein a region where the magnetization reversal field is relatively small is made of a material having a relatively small anisotropy magnetic field, comprises a greater amount of the material having a relatively small anisotropy magnetic field in a thickness direction, and is positioned in a down-track direction of the pattern dot,
wherein a region where the magnetization reversal field is relatively large is made of a material having a relatively large anisotropy magnetic field, and comprises a greater amount of the material having a relatively large anisotropy magnetic field in the thickness direction,
wherein the pattern dot comprises a plurality of magnetic material parts different in the magnetization reversal field and has a smaller height in a vertical direction of the substrate than a width and a length in the in-plane direction of the substrate,
wherein the plurality of magnetic material parts are joined in the in-plane direction of the substrate,
wherein the arrangement of the plurality of magnetic material parts different in the magnetization reversal field is common between the adjacent pattern dots,
wherein an easy axis of magnetization for magnetic material within the pattern dot is perpendicular to a substrate plane,
wherein the magnetic recording medium is characterized as having an anisotropy of about 800 kA/m to about 1100 kA/m,
wherein the magnetic recording medium is characterized as having a coercive force of about 415 kA/m to about 520 kA/m,
wherein each pattern dot comprises a hard magnetic material and a soft magnetic material in approximately equal amounts.

13. The magnetic recording medium according to claim 1, wherein the magnetic recording medium is characterized as having an anisotropy of about 800 kA/m to about 1100 kA/m, and
wherein the magnetic recording medium is characterized as having an coercive force of about 415 kA/m to about 520 kA/m.

14. The magnetic recording medium according to claim 1, wherein each pattern dot comprises a hard magnetic material and a soft magnetic material in approximately equal amounts.

15. A magnetic recording method for a pattern medium, the method comprising:
controlling a tracking position of a recording head to scan a recording magnetic pole center portion on a side where a magnetization reversal field is relatively greater than at a center of a pattern dot of an artificial pattern on a medium; and
applying a recording magnetic field in synchronism with a time when a trailing edge of the recording magnetic pole passes over the pattern dot,
wherein the medium comprises a substrate and a magnetic recording film having the artificial pattern including pattern dots cut by patterning positioned above the substrate,
wherein an individual pattern dot is a minimum magnetization reversal unit bearing recorded information as magnetic information,
wherein each pattern dot has a gradient of a magnetization reversal field in an in-plane direction of the substrate,
wherein an easy axis of magnetization for magnetic material within the pattern dot is perpendicular to a substrate plane, and
wherein the pattern dot comprises at least two magnetic materials having different magnetization reversal field values, the at least two magnetic materials being positioned adjacent each other in the in-plane direction and in direct contact with each other, and
wherein a gradient direction of the magnetization reversal field is substantially coincident between adjacent pattern dots.

16. The method of claim 15, wherein the pattern dot has a gradient of a magnetization reversal field in a track transverse direction.

17. The method of claim 15, wherein the pattern dot has a gradient of a magnetization reversal field in a track direction.

18. A magnetic recording method for a pattern medium, the method comprising:
controlling a tracking position of a recording head so that a stronger magnetic field is applied to a region where a magnetization reversal field of a pattern dot of an artificial pattern including pattern dots cut by patterning positioned above a substrate on a medium to record is relatively greater; and
applying a recording magnetic field in synchronism with a timing when a trailing edge of the recording magnetic pole passes over the pattern dot to record,
wherein an individual pattern dot is a minimum magnetization reversal unit hearing recorded information as magnetic information,
wherein each pattern dot has a gradient of a magnetization reversal field in a track transverse direction and in an in-plane direction,
wherein a region where the magnetization reversal field is relatively small is disposed on a side of the pattern dot having a previously recorded track, wherein a gradient direction of the magnetization reversal field is substantially coincident between adjacent pattern dots, wherein an easy axis of magnetization for magnetic material within the pattern dot is perpendicular to a substrate plane, and wherein each pattern dot is comprised of two magnetic materials having different magnetization reversal field values, the two magnetic materials being positioned adjacent each other in the in-plane direction and in direct contact with each other.

19. A magnetic recording method for a pattern medium, the method comprising:

locally heating a region where a magnetization reversal field of a pattern dot of an artificial pattern of a magnetic recording medium to record is relatively greater, wherein the artificial pattern comprises pattern dots cut by patterning positioned above a substrate; and applying a recording magnetic field to the pattern dot to record, wherein an individual pattern dot is a minimum magnetization reversal unit bearing recorded information as magnetic information, wherein each pattern dot has a gradient of a magnetization reversal field in an in-plane direction of a substrate, and wherein a gradient direction of the magnetization reversal field is substantially coincident between adjacent pattern dots, wherein an easy axis of magnetization for magnetic material within the pattern dot is perpendicular to a substrate plane, and wherein each pattern dot is comprised of two magnetic materials having different magnetization reversal field values, the two magnetic materials being positioned adjacent each other in the in-plane direction and in direct contact with each other.

20. The magnetic recording method according to claim 19, wherein the local heating is intermittent and in synchronism with the application of the recording magnetic field.

* * * * *

UNITED STATES PATENT AND TRADEMARK OFFICE
CERTIFICATE OF CORRECTION

PATENT NO.       : 8,169,728 B2
APPLICATION NO.  : 12/630728
DATED            : May 1, 2012
INVENTOR(S)      : Nemoto et al.

Page 1 of 1

It is certified that error appears in the above-identified patent and that said Letters Patent is hereby corrected as shown below:

In the specification:

col. 1, line 61 replace "hit" with --bit--;
col. 13, line 15 replace "Field" with --field--;
col. 15, line 40 replace "ER" with --EB--.

Signed and Sealed this
Third Day of July, 2012

David J. Kappos
*Director of the United States Patent and Trademark Office*